United States Patent
Unagami et al.

(10) Patent No.: US 11,647,021 B2
(45) Date of Patent: *May 9, 2023

(54) AUTHENTICATION METHOD, AUTHENTICATION SYSTEM, AND CONTROLLER

(71) Applicant: PANASONIC INTELLECTUAL PROPERTY CORPORATION OF AMERICA, Torrance, CA (US)

(72) Inventors: Yuji Unagami, Osaka (JP); Manabu Maeda, Osaka (JP); Tomoki Takazoe, Kanagawa (JP); Yoichi Masuda, Osaka (JP); Hideki Matsushima, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/215,810

(22) Filed: Mar. 29, 2021

(65) Prior Publication Data

US 2021/0218739 A1   Jul. 15, 2021

Related U.S. Application Data

(63) Continuation of application No. 16/552,445, filed on Aug. 27, 2019, now Pat. No. 10,992,667, which is a
(Continued)

(30) Foreign Application Priority Data

Mar. 24, 2015   (JP) .............................. JP2015-060813

(51) Int. Cl.
*H04L 9/00* (2022.01)
*H04L 9/40* (2022.01)
(Continued)

(52) U.S. Cl.
CPC ........ *H04L 63/0869* (2013.01); *G06F 21/445* (2013.01); *H04L 9/0833* (2013.01);
(Continued)

(58) Field of Classification Search
CPC ... H04L 63/104; H04L 63/065; H04L 9/3273; H04L 9/3263; H04L 9/30; H04L 9/14;
(Continued)

(56) References Cited

U.S. PATENT DOCUMENTS 7,561,694 B1   7/2009   Chakrabarti et al.
10,298,394 B2   5/2019   Rhelimi
(Continued)

FOREIGN PATENT DOCUMENTS

EP   1 624 628 A2   2/2006
JP   2005-341528   12/2005
(Continued)

OTHER PUBLICATIONS

International Search Report, dated Jul. 28, 2015, of International Application No. PCT/JP2015/002525.
(Continued)

*Primary Examiner* — Josnel Jeudy
(74) *Attorney, Agent, or Firm* — Greenblum & Bernstein, P.L.C.

(57) ABSTRACT

In an authentication method, a first controller generates a first group key, executes first mutual authentication with devices within a group, and shares the first group key with devices that have succeeded in the first mutual authentication. When a second controller joins the group, the first controller decides which coordinator manages a group key used in common. The first controller executes second mutual authentication with the coordinator, and shares the first group key with the coordinator when the second mutual authentication is successful. The coordinator performs
(Continued)

encrypted communication within the group using the first group key, generates a second group key when the first group key valid time runs out and before updating the first group key, executes third mutual authentication with the devices and a third controller, and updates the first group key of the devices and the third controller that have succeeded in the third authentication.

6 Claims, 25 Drawing Sheets

Related U.S. Application Data continuation of application No. 15/358,283, filed on Nov. 22, 2016, now Pat. No. 10,440,021, which is a continuation of application No. PCT/JP2015/002525, filed on May 20, 2015.

(60) Provisional application No. 62/010,181, filed on Jun. 10, 2014, provisional application No. 62/009,984, filed on Jun. 10, 2014.

(51) Int. Cl.
*G06F 21/44* (2013.01)
*H04L 9/08* (2006.01)
*H04L 9/32* (2006.01)
*H04L 9/14* (2006.01)
*H04L 9/30* (2006.01)

(52) U.S. Cl.
CPC .......... *H04L 9/0844* (2013.01); *H04L 9/0891* (2013.01); *H04L 9/14* (2013.01); *H04L 9/30* (2013.01); *H04L 9/3263* (2013.01); *H04L 9/3273* (2013.01); *H04L 63/065* (2013.01); *H04L 63/104* (2013.01)

(58) Field of Classification Search
CPC ... H04L 9/0891; H04L 9/0844; H04L 9/0833; H04L 63/0869; G06F 21/445
USPC .......................................................... 713/156
See application file for complete search history.

(56) References Cited

U.S. PATENT DOCUMENTS

| | | |
|---|---|---|
| 2004/0128252 A1 | 7/2004 | Shirai et al. |
| 2006/0115085 A1 | 6/2006 | Iwamura |
| 2006/0236384 A1 | 10/2006 | Lindholm et al. |
| 2007/0097878 A1 | 5/2007 | Morioka et al. |
| 2010/0208898 A1 | 8/2010 | Acar et al. |
| 2010/0254361 A1 | 10/2010 | Naito et al. |
| 2015/0363603 A1 | 12/2015 | Hsu et al. |
| 2016/0066354 A1* | 3/2016 | Oba .................... H04W 12/069 370/392 |
| 2016/0080340 A1 | 3/2016 | Oba et al. |
| 2016/0182493 A1 | 6/2016 | Volini et al. |
| 2016/0283699 A1 | 9/2016 | Levin et al. |
| 2017/0187758 A1 | 6/2017 | Denker et al. |
| 2017/0280894 A1 | 8/2017 | Scarborough et al. |
| 2018/0167212 A1 | 6/2018 | Walrant |
| 2018/0357105 A1 | 12/2018 | Rishabh et al. |
| 2020/0119912 A1 | 4/2020 | Neumann et al. |

FOREIGN PATENT DOCUMENTS

| | | |
|---|---|---|
| JP | 2006-526933 | 11/2006 |
| JP | 2010-245847 | 10/2010 |
| JP | 2013-207496 | 10/2013 |
| JP | 2013-240021 | 11/2013 |
| JP | 2004-133576 | 4/2014 |

OTHER PUBLICATIONS

Federal Information Processing Standards Publication (FIPS PUB) 186-4: "Digital Signature Standard (DSS)", National Institute of Standards and Technology (NIST), Jul. 2013.

NIST Special Publication 800-56A Revision 2: "Recommendation for Pair-Wise Key Establishment Schemes Using Discrete Logarithm Cryptography", National Institute of Standards and Technology (NIST), May 2013.

IETF: RFC 5191: "Protocol for Carrying Authentication for Network Access (PANA)", Internet Engineering Task Force (IETF), May 2008.

IETF: RFC 6347: "Datagram Transport Layer Security Version 1.2", Internet Engineering Task Force (IETF), Jan. 2012.

Extended European Search Report, dated Apr. 20, 2017, by the European Patent Office (EPO) for the related European Patent Application No. 15807040.9.

\* cited by examiner

| 501 | 502 | 503 | 504 | 505 | 506 |
|---|---|---|---|---|---|
| DEVICE ID | CERTIFICATE ID | SHARED KEY | GROUP KEY | GROUP KEY VALID TIME (SECONDS) | GROUP KEY UPDATE FLAG |
| 001 | 00a | 1010...1 | 01101...1 | 86400 | 1 |
| 002 | 00b | 1011...0 | 01101...1 | 86400 | 1 |
| ... | ... | ... | ... | ... | ... |

| | | |
|---|---|---|
| 511 | CONTROL DEVICE | 001,... |
| 512 | SECURITY COORDINATOR (SC) | 003 |
| 513 | AFFILIATED DEVICES | 001, 002,... |

| CONTROLLER ID (901) | CERTIFICATE ID (902) | SHARED KEY (903) | GROUP KEY (904) |
|---|---|---|---|
| 003 | 00c | 1010...1 | 01101...1 |
| 004 | 00d | 1110...1 | 01101...1 |
| ... | ... | ... | ... |

| | | |
|---|---|---|
| 911 | CONTROL CONTROLLER | 003, 004,... |
| 912 | SECURITY COORDINATOR (SC) | 003 |

| | 501 | 502 | 503 | 504 | 505 | 506 |
|---|---|---|---|---|---|---|
| | DEVICE ID | CERTIFICATE ID | SHARED KEY | GROUP KEY | GROUP KEY VALID TIME (SECONDS) | GROUP KEY UPDATE FLAG |
| | 001 | 00a | 1010...1 | 01101...1 | 86400 | 1 |

| | | |
|---|---|---|
| 511 | CONTROL DEVICE | 001 |
| 512 | SECURITY COORDINATOR | 003 |
| 513 | AFFILIATED DEVICES | 001 |

| | 501 | 502 | 503 | 504 | 505 | 506 |
|---|---|---|---|---|---|---|
| | DEVICE ID | CERTIFICATE ID | SHARED KEY | GROUP KEY | GROUP KEY VALID TIME (SECONDS) | GROUP KEY UPDATE FLAG |
| | 002 | 00b | 1011...0 | 01110...0 | 2280 | 1 |

| | | |
|---|---|---|
| 511 | CONTROL DEVICE | 002 |
| 512 | SECURITY COORDINATOR | 004 |
| 513 | AFFILIATED DEVICES | 002 |

| CONTROLLER ID (901) | CERTIFICATE ID (902) | SHARED KEY (903) | GROUP KEY (904) |
|---|---|---|---|
| 003 | 00c | 1010...1 | 01101...1 |

| | | |
|---|---|---|
| 911 | CONTROL DEVICE | 003 |
| 912 | SECURITY COORDINATOR | 003 |

| CONTROLLER ID (901) | CERTIFICATE ID (902) | SHARED KEY (903) | GROUP KEY (904) |
|---|---|---|---|
| 004 | 00d | 1011...0 | 01110...0 |

| | | |
|---|---|---|
| 911 | CONTROL DEVICE | 004 |
| 912 | SECURITY COORDINATOR | 004 |

| 501 | 502 | 503 | 504 | 505 | 506 |
|---|---|---|---|---|---|
| DEVICE ID | CERTIFICATE ID | SHARED KEY | GROUP KEY | GROUP KEY VALID TIME (SECONDS) | GROUP KEY UPDATE FLAG |
| 001 | 00a | 1010...1 | 01101...1 | 86400 | 1 |
| 002 | 00b | 1100...1 | 01110...0 | 2280 | 0 |
| 004 | 00d | 1101...0 | 01110...0 | 2280 | 0 |

| | | |
|---|---|---|
| 511 | CONTROL DEVICE | 001 |
| 512 | SECURITY COORDINATOR | 003 |
| 513 | AFFILIATED DEVICES | 001, 002, 004 |

| 501 | 502 | 503 | 504 | 505 | 506 |
|---|---|---|---|---|---|
| DEVICE ID | CERTIFICATE ID | SHARED KEY | GROUP KEY | GROUP KEY VALID TIME (SECONDS) | GROUP KEY UPDATE FLAG |
| 002 | 00b | 1011...0 | 01110...0 | — | — |
| 003 | 00c | 1101...0 | 01110...0 | — | — |

| | | |
|---|---|---|
| 511 | CONTROL DEVICE | 002 |
| 512 | SECURITY COORDINATOR | 003 |
| 513 | AFFILIATED DEVICES | — |

| CONTROLLER ID (901) | CERTIFICATE ID (902) | SHARED KEY (903) | GROUP KEY (904) |
|---|---|---|---|
| 003 | 00c | 1010...1 | 01101...1 |

| | |
|---|---|
| 911 — CONTROL DEVICE | 003 |
| 912 — SECURITY COORDINATOR | 003 |

| CONTROLLER ID (901) | CERTIFICATE ID (902) | SHARED KEY (903) | GROUP KEY (904) |
|---|---|---|---|
| 004 | 00d | 1011...0 | 01110...0 |
| 003 | 00c | 1100...1 | 01110...0 |

| | |
|---|---|
| 911 — CONTROL DEVICE | 004 |
| 912 — SECURITY COORDINATOR | 003 |

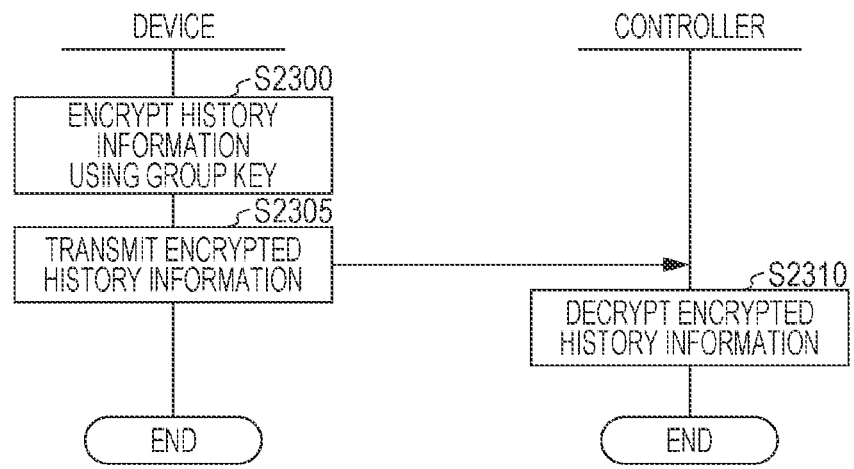
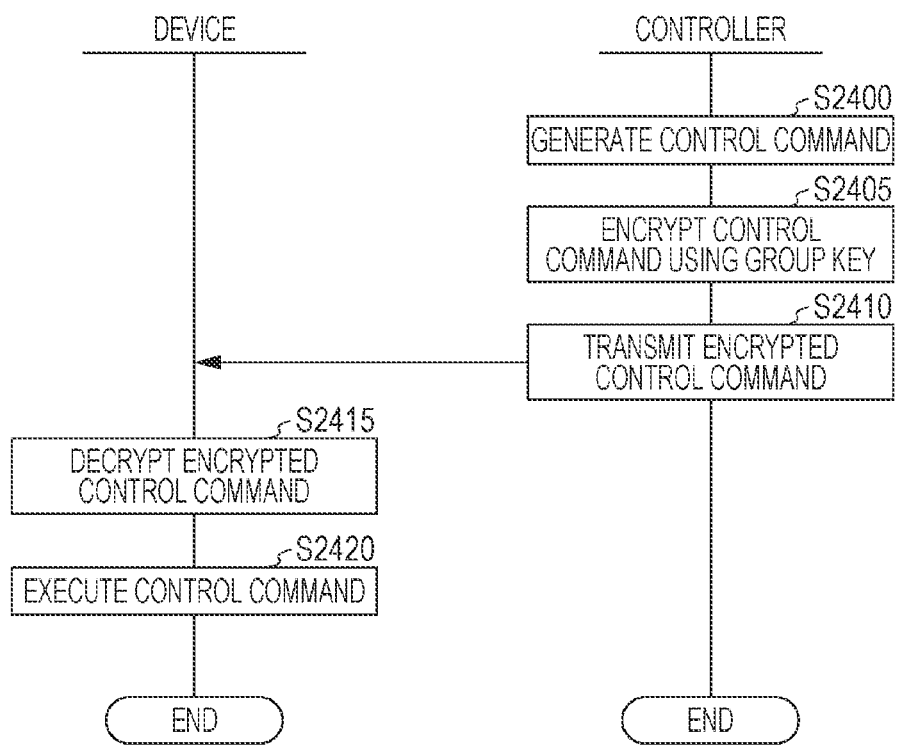

AUTHENTICATION METHOD, AUTHENTICATION SYSTEM, AND CONTROLLER

CROSS REFERENCE TO RELATED APPLICATION

This is a continuation of U.S. patent application Ser. No. 16/552,445, filed Aug. 27, 2019, which is a continuation of U.S. patent application Ser. No. 15/358,283, filed Nov. 22, 2016, now U.S. Pat. No. 10,440,021 issued Oct. 8, 2019, which is a continuation of International Pat. Appl. No. PCT/JP2015/002525, filed May 20, 2015, which claims the benefit of U.S. Provisional Pat. Appl. Nos. 62/009,984, filed Jun. 10, 2014, and 62/010,181, filed Jun. 10, 2014, and which claims the benefit of Jap. Pat. Appl. No. 2015-060813, filed Mar. 24, 2015. The disclosure of each of the above-identified documents, including the specification, drawings, and claims, is incorporated herein by reference in its entirety.

1. TECHNICAL FIELD

The present invention relates to technology of performing mutual authentication between a controller and device connected to a network, and sharing a group key.

2. DESCRIPTION OF THE RELATED ART

As of recent, there is expectation for services using various types of history information collected from devices and the like (hereinafter referred to simply as "devices") such as home appliances, audio and visual (AV) devices, household equipment, and so forth, that have network connection capabilities, and collected in a server in a cloud.

A conceivable arrangement in such a service is to establish a device that controls devices in the home (hereafter referred to as "controller"), and the controller to relay communication between the devices and the server in the cloud. In doing so, it is required that the connection between the controller and the device prevent information from leaking, such as spoofing by unauthorized devices and interception of communication contents.

An example of countering spoofing by unauthorized devices that is performed includes authentication of the legitimacy of controllers and devices using public key infrastructure (PKI). An example of countering information leakage is encrypted communication being performed between controllers and devices of which the legitimacy has been authenticated sharing a key for encrypted communication.

In a case where there are multiple devices connecting to a controller, the controller and the devices sharing the same key for encrypted communication (hereinafter referred to as "group key") enables encryption of multicast communication and broadcast communication where the controller transmits the same information to the devices at once.

For description of this technology, see Japanese Patent No. 4576997, Federal Information Processing Standards Publication (FIPS PUB) 186-4: Digital Signature Standard (DSS), National Institute of Standards and Technology (NIST),
July 2013, and NIST Special Publication 800-56A Revision 2: Recommendation for Pair-Wise Key Establishment Schemes Using Discrete Logarithm Cryptography, National Institute of Standards and Technology (NIST), May 2013.

SUMMARY

In one general aspect, the techniques disclosed here feature an authentication method for a group to which one or more devices and one or more controllers including a first controller on a network belong. The method includes: the first controller generates a first group key, executes first mutual authentication with devices within the group, and shares the first group key with devices that have succeeded in authentication; in a case where a second controller newly joins the group, at least one controller within the group decides a coordinator that manages a group key used in common in the group, from controllers including the one or more controllers and the second controller newly joined in the group, in accordance with attributes of the controllers; the first controller executes second mutual authentication with the coordinator, and shares the first group key with the coordinator in a case where the authentication is successful; the coordinator performs encrypted communication within the group using the first group key; and the coordinator generates a second group key when valid time of the first group key is equal to or smaller than a predetermined value, executes third mutual authentication with the devices and controllers within the group, and updates the group key of the devices and controllers that have succeeded in authentication to the second group key.

According to the present disclosure, in a case where multiple controllers exist in a group on a network, a suitable controller can be selected as a coordinator that manages a group key used in common within the group.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5A is a diagram illustrating an example of a connected device management table, that the controller stores;

FIG. 5B is a diagram illustrating an example of information relating to a group, stored in the controller;

FIG. 9A is a diagram illustrating an example of a connected controller management table, that a device stores;

FIG. 9B is a diagram illustrating an example of information relating to a group, stored in the device;

FIG. 19A is a diagram illustrating a connected device management table, stored in a controller A before group integration;

FIG. 19B is a diagram illustrating information relating to a group, stored in the controller A before group integration;

FIG. 19C is a diagram illustrating a connected device management table, stored in a controller B before group integration;

FIG. 19D is a diagram illustrating information relating to the group, stored in the controller B before group integration;

FIG. 20A is a diagram illustrating a connected controller management table, stored the device A before group integration;

FIG. 20B is a diagram illustrating information relating to the group, stored in the device A before group integration;

FIG. 20C is a diagram illustrating a connected controller management table, stored in the device B before group integration;

FIG. 20D is a diagram illustrating information relating to the group, stored in the device B before group integration;

FIG. 21A is a diagram illustrating a connected device management table, stored in the controller A after group integration;

FIG. 21B is a diagram illustrating information relating to the group, stored in the controller A after group integration;

FIG. 21C is a diagram illustrating a connected device management table, stored in the controller B after group integration;

FIG. 21D is a diagram illustrating information relating to the group, stored in the controller B after group integration;

FIG. 22A is a diagram illustrating a connected controller management table, stored the device A after group integration;

FIG. 22B is a diagram illustrating information relating to the group, stored in the device A after group integration;

FIG. 22C is a diagram illustrating a connected controller management table, stored in the device B after group integration;

FIG. 22D is a diagram illustrating information relating to the group, stored in the device B after group integration;

FIG. 23 is a sequence diagram illustrating an example of device history information transmission processing;

FIG. 24 is a sequence diagram illustrating an example of control command transmission processing;

DETAILED DESCRIPTION (Background Leading to Present Disclosure)

An arrangement is conceivable in a network such as a home area network (HAN) or the like where multiple controllers control the same device. In such an arrangement, each controller individually generates a group key, distributes to the device, and the device performs encrypted communication using a different group key for each controller. However, there are some devices that cannot assign appropriate resources necessary to perform encrypted communication using multiple group keys. For example, there is the possibility that the computation capabilities of a device may be low, and encrypted communication cannot be performed using multiple group keys. Also, in a case where the storage capacity of the device is small, there is the possibility that not all group keys necessary for encrypted communication with all controllers can be stored.

Accordingly, a configuration is conceivable where part or all of the devices and controllers on a network configure a group, a controller to manage the group key is selected from the controllers in the group, the controller that is decided upon generates a group key, and distributes this to the devices and controllers within the group. However, this configuration has a problem with regard to which controller is to manage the group key. For example, some controllers may frequently experience power cutoff or state of disconnect from the network, and not be able to communicate with other devices and controllers at all times. Randomly deciding the controller to manage the group key can result in such a controller being selected. In a state where communication cannot be performed with controller managing the group key, new devices or controllers cannot join the group and share the group key. It also is desirable to periodically update the group key from a security perspective, but in a state where communication cannot be made with the controller managing the group key, the group key cannot be updated. The conventional authentication system has needed further improvement regarding group keys. The present disclosure provides an authentication method for deciding a suitable controller as a controller to manage a group key used in common within a group, in a case where multiple controllers exist within a group on a network.

First Embodiment

The authentication system according to embodiments of the present disclosure will be described below with reference to the drawings. Note that values, shapes, materials, components, placements and connected states of components, steps, and the order of steps, and so forth illustrated in the following embodiments, are only exemplary, and do not restrict the present disclosure.

Overview

Figure 1:
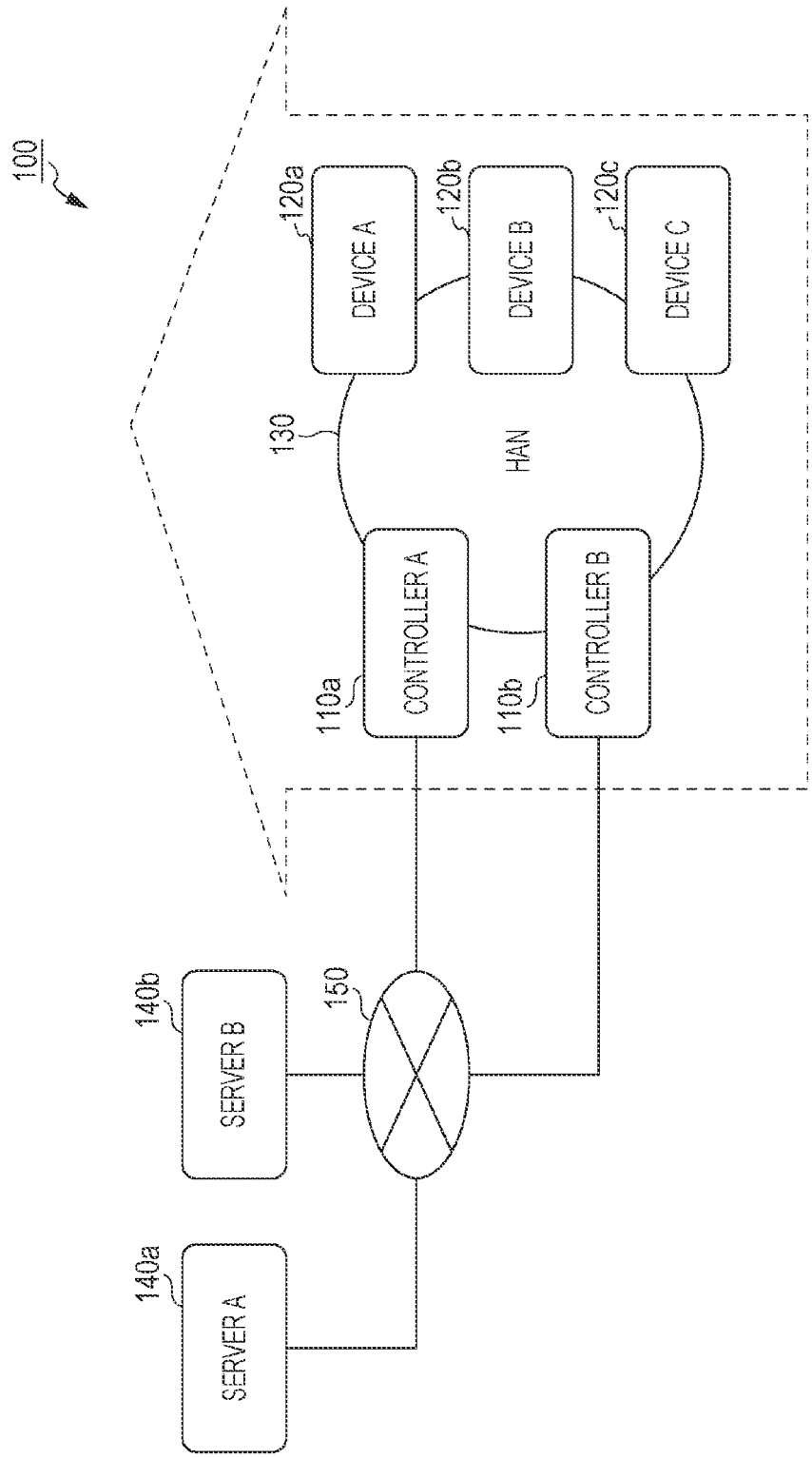
FIG. 1 is a diagram illustrating an example of an authentication system.

The overview of an authentication system 100 will be described here as an embodiment of the present disclosure. FIG. 1 is a diagram illustrating the configuration of the authentication system 100. The authentication system 100 is configured including a controller 110 (controller 110a and controller 110b) and device 120 (devices 120a, 120b, and 120c) on a HAN 130. The controller 110 is also connected to a server 140 (server 140a and server 140b) via a network 150.

The device 120 is a home appliance, AV device, or household equipment, having functions to connect to a network, examples including a television, recorder, air conditioner refrigerator, battery, and so forth. The controller 110 is a device having functions of controlling a device 120, and generates control commands in accordance with being commissioned by the server 140 for example, and the generated commands are transmitted to the device 120 to be executed. The controller 110 also has a function of transmitting information stored in the device 120 to the server 140. The controller 110 controls devices 120 that are registered by pairing, and the devices 120 execute control commands transmitted from a controller 110 registered by pairing.

The HAN 130 is a wired or wireless network constructed within the home. The HAN 130 is specifically realized by Ethernet (a registered trademark), specified low power radio (a Japanese standard), Wi-Fi (a registered trademark), Bluetooth (a registered trademark), power-line communication, or the like. The network 150 is a network configured between the home and a corporation or the like, which may or may not be interconnected by the Internet.

In the authentication system 100, one group is formed that shares one group key among one or more controllers 110 on the HAN 130, and one or more devices 120 that have paired with the one or more controllers 110. The group key is generated by a controller 110, and is distributed from controller 110 to device 120 when the controller 110 and device 120 perform authentication processing or the like.

Figure 2:
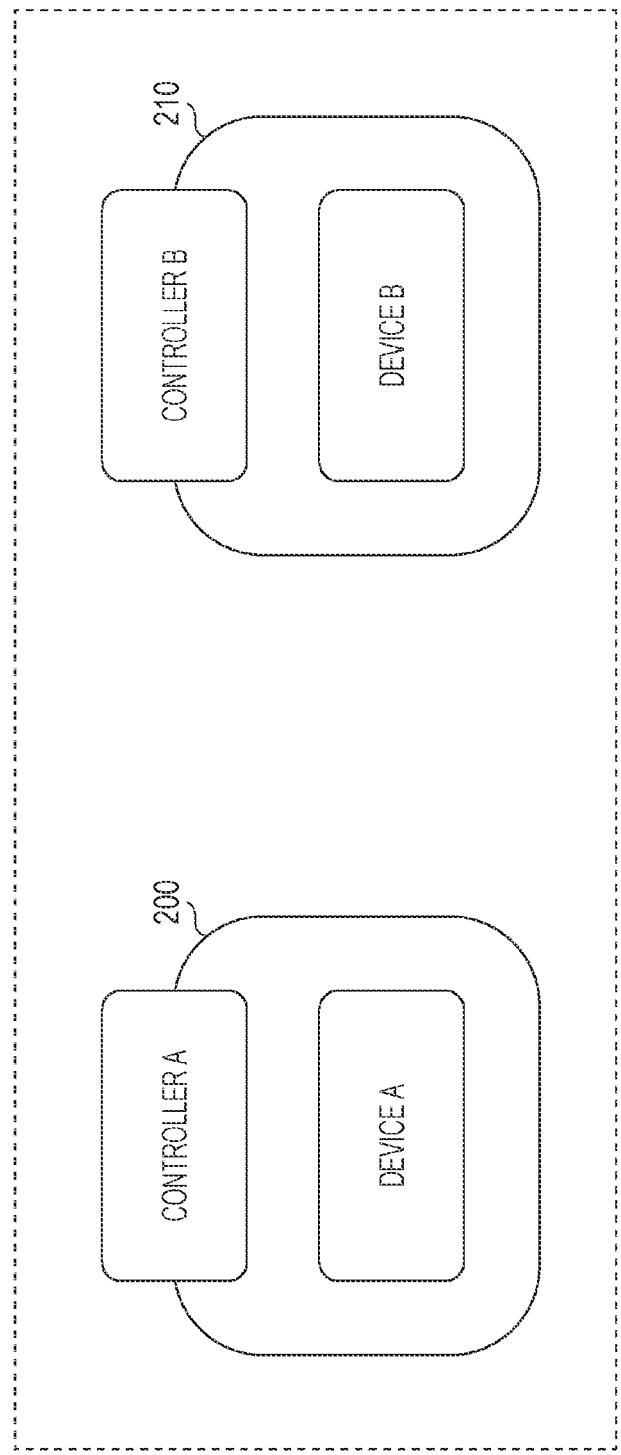
FIG. 2 is a diagram illustrating an example of a group configuration within a home area network (HAN)

FIG. 2 is a diagram illustrating an example of group configurations of controllers 110 and devices 120 on the HAN 130. FIG. 2 illustrates a group 200 to which a controller A and device A belong, and a group 210 to which a controller B and device B belong. The group 200 and group 210 share different group keys. Accordingly, even if group 200 and group 210 use the same communication method, the contents being communicated within each other's group will not leak outside of the group.

When pairing occurs between devices or controllers belonging to different groups in the authentication system 100, the two groups are integrated. For example, in a case where the device A and controller B are paired in the state of group configurations illustrated in FIG. 2, the group configuration is changed to that illustrated in FIG. 3. At this time, the authentication system 100 decides on one of the controllers to perform authentication processing and group key management processing, and the controller that is decided upon undertakes generating and distribution of the group key. In the present disclosure, the controller that performs authentication processing and group key management processing is called an SC (Security Coordinator). Note that devices and controllers other than the SC may be referred to as nodes. In the example in FIG. 3, the controller A has been decided to be the SC. That is to say, only the controller A, that is the SC, performs authentication processing with the devices and group key generation and distribution in the group 300, and the controller B does not. The controller B uses the group key that the controller A, that is the SC, has generated and distributed, to control the device A and device B regarding which pairing has been performed.

Configuration

Next, the configuration of the controller 110 and device 120, which are primary components of the authentication system 100, will be described.

Configuration of Controller

Figure 4:
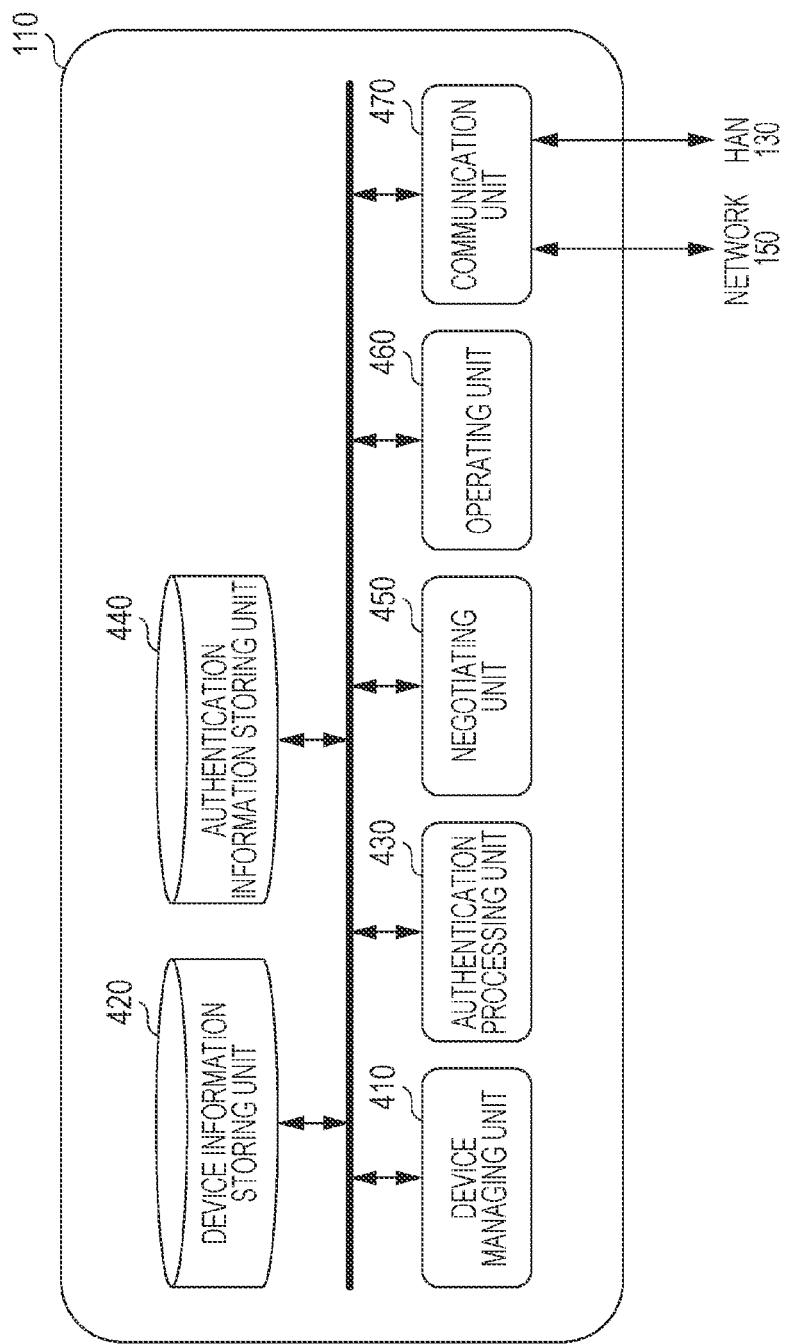
FIG. 4 is a diagram illustrating an example of a functional configuration of a controller.

First, the configuration of the controller 110 will be described with reference to FIGS. 4 through 7. FIG. 4 is a diagram illustrating the functional configuration of the controller 110. The controller 110 includes a device managing unit 410, a device information storing unit 420, an authentication processing unit 430, an authentication information storing unit 440, a negotiating unit 450, an operating unit 460, and a communication unit 470.

The device managing unit 410 manages devices 120 and other controllers 110 connected to its device (the controller 110). The device managing unit 410 functions to accept pairing requests and mutual authentication requests from devices 120 and other controllers 110 via the communication unit 470, group key update requests from the device information storing unit 420, and so forth, commission the authentication processing unit 430 and so forth to perform processing according to the request, and updates a connected device management table 500 and group-related information 510, stored in the device information storing unit 420, in accordance with the results of the commissioning.

FIG. 5A is a diagram illustrating an example of the connected device management table 500 stored in the device information storing unit 420. FIG. 5B is a diagram illustrating an example of the group-related information 510 stored in the device information storing unit 420.

The connected device management table 500 has recorded therein, for every device 120 (or other controller 110) connected to itself (the controller 110), a device ID 501, certificate ID 502, shared key 503, group key 504, group key valid time 505, and group key update flag 506. The device ID 501 is information for uniquely identifying the device 120. The certificate ID 502 is a certificate ID of a public key certificate that the device 120 has. The shared key 503 is data of a shared key shared with the device 120. The group key 504 is data of a group key set to the device 120. The group key valid time 505 is the remaining time in the valid period of the group key set to the device 120. The group key update flag 506 is flag information indicating whether or not the group key of the device 120 has been updated to the newest.

Group-related information 510 has recorded therein controlling device 511, SC 512, and affiliated devices 513. The controlling device 511 is the device ID of the device 120 regarding which pairing has been performed with. The SC 512 is the device ID of the SC of the group to which the SC belongs. Note that the SC 512 of the controller 110 is set to a value indicating its own device ID of when shipping. The affiliated devices 513 are device IDs of devices 120 and other controllers 110 belonging to the group under the SC itself.

The device information storing unit 420 functions to cause the value of the group key valid time 505 to be counted down along with elapsing of time, and in a case where the value of the group key valid time 505 is a predetermined value or lower, performs a group key update request to the device managing unit 410. The predetermined value is such as, for example, a value that is 10% of the initially set value, a value twice the time necessary to update the group key, or the like.

Returning to FIG. 4, description of the configuration of the controller 110 will be continued. The authentication processing unit 430 functions to perform authentication processing with devices 120 and other controllers 110 in accordance with a commission from the device managing unit 410. Details of the authentication processing performed by the authentication processing unit 430 will be described later.

The authentication information storing unit 440 stores the secret key and public key certificate of its device (the controller 110). The authentication information storing unit 440 also stores a certificate revocation list (CRL) used to confirm that the public key certificate of the device of another party has not been revoked, and a digital certificate including the public key of a certifying authority. Note that the key pair of the secret key and public key certificate, CRL, and digital certificate, have been embedded when the controller 110 ships.

Figure 6:
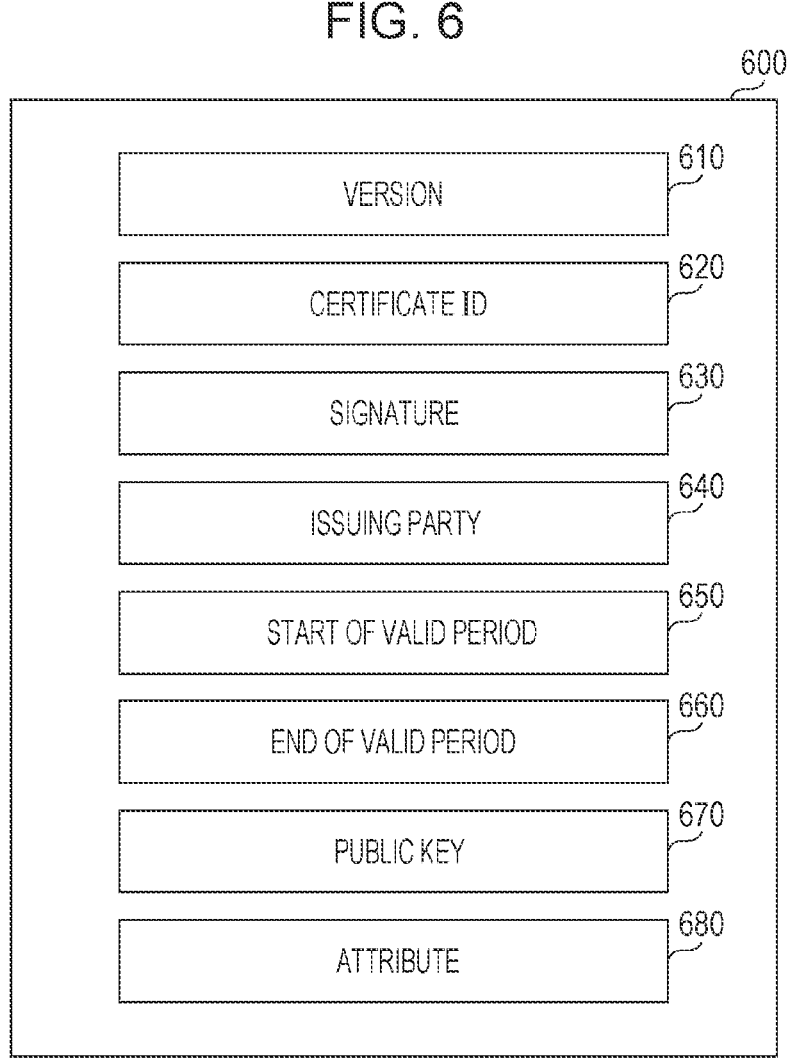
FIG. 6 is a diagram illustrating an example of a public key certificate.

FIG. 6 is a diagram illustrating an example of the data configuration of a public key certificate 600 that the authentication information storing unit 440 stores. The public key certificate 600 is configured including data of version 610, certificate ID 620, signature 630, issuing party 640, start of valid period 650, end of valid period 660, public key 670, and attribute 680, for example.

Figure 7:
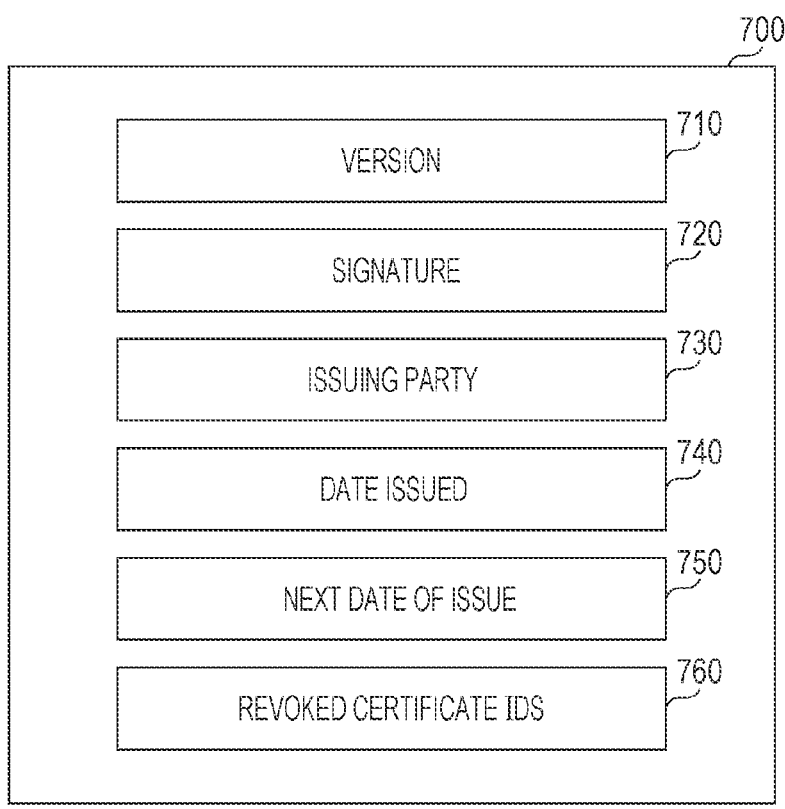
FIG. 7 is a diagram illustrating an example of a certificate revocation list (CRL)

FIG. 7 is a diagram illustrating an example of the data configuration of a CRL 700 that the authentication information storing unit 440 stores. The CRL 700 is configured including data of version 710, signature 720, issuing party 730, date issued 740, next date of issue 750, and revoked certificate IDs, for example.

Returning to FIG. 4, description of the configuration of the controller 110 will be continued. In a case where there are multiple controllers 110 within a single group, and pairing has occurred between devices belonging to different groups or the like, for example, the negotiating unit 450 communicates with other controllers 110, and performs negotiation processing to decide which controller will be the SC. Details of the negotiation processing performed by the negotiating unit 450 will be described later.

The functional units that are the device managing unit 410, device information storing unit 420, authentication processing unit 430, authentication information storing unit 440, and negotiating unit 450, typically are realized by a processor executing a program stored in memory.

The operating unit 460 is configured including a pairing button, and a control circuit that generates an interrupt signal in accordance with the pressing of this button and notifies the processor.

The communication unit 470 is realized by a communication Large Scale Integration (LSI) having communication functions. The communication unit 470 is connected to the HAN 130 and to the network 150, and has functions of communicating with devices 120 and other controllers 110 connected to the HAN 130 via the HAN 130, and communicating with the server 140 via the network 150. Connection between the controller 110 and the network 150 may be performed via a gateway device omitted from illustration.

The communication unit 470 performs encrypted communication as suitable using the group key received from the authentication processing unit 430 or the like to communicate with devices 120 and other controllers 110. The communication unit 470 preforms Secure Socket Layer (SSL) communication for communication with the server 140. The communication unit 470 stores certificates and the like necessary for SSL communication.

Configuration of Device

Figure 8:
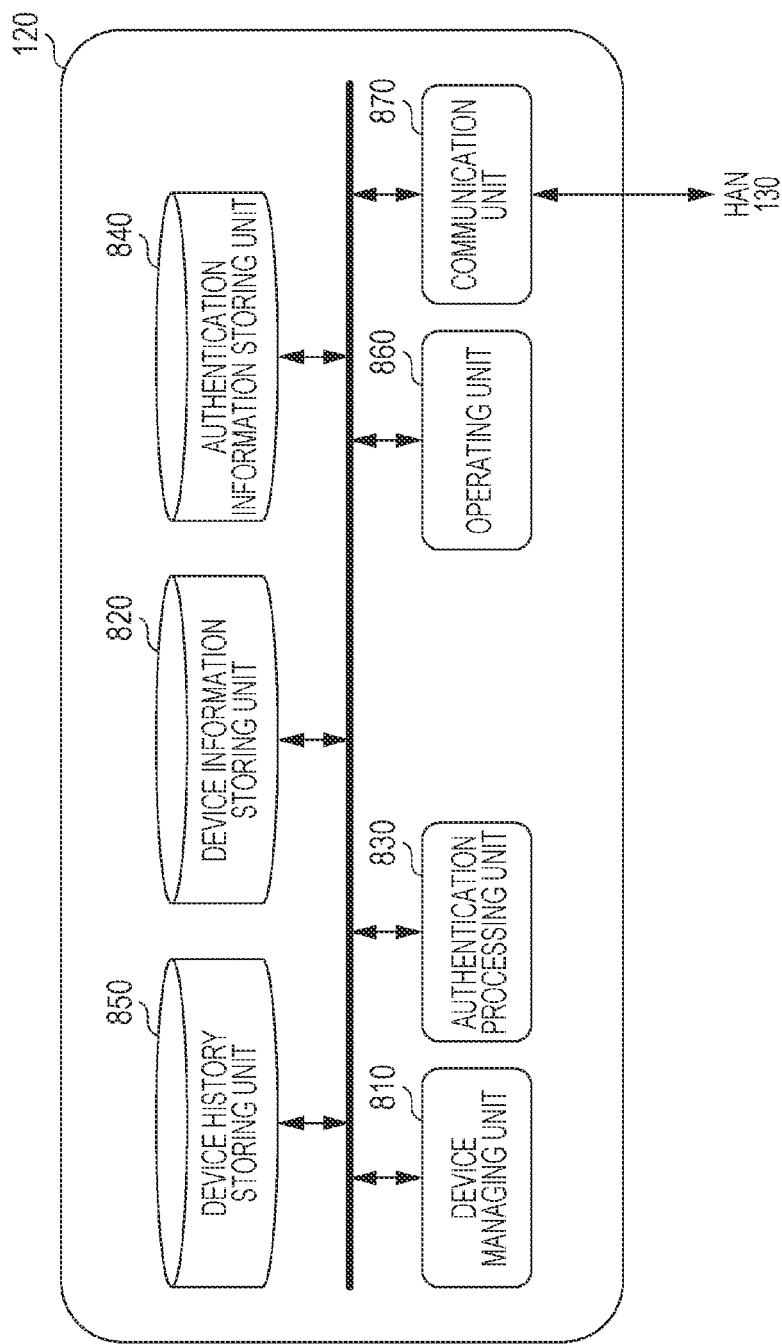
FIG. 8 is a diagram illustrating an example of a functional configuration of a device.

Next, the configuration of the device 120 will be described with reference to FIGS. 8 through 9B. FIG. 8 is a diagram illustrating the functional configuration of the device 120. The device 120 is configured including a device managing unit 810, a device information storing unit 820, an authentication processing unit 830, an authentication information storing unit 840, a device history storing unit 850, an operating unit 860, and a communication unit 870.

The device managing unit 810 manages controllers 110 connected to itself (the device 120). The device managing unit 810 functions to activate a registration mode with an interruption signal from the operating unit 860 as a trigger and transmit a pairing request to a controller 110, and also functions to update a connected controller management table 900 and group-related information 910, stored in the device information storing unit 820, in accordance to processing results by the authentication processing unit 830 and so forth. The device managing unit 810 also functions to encrypt device history information recorded in the device history storing unit 850 using the group key, and periodically or non-periodically transmit to the server 140 via the controller 110.

FIG. 9A is a diagram illustrating an example of the connected controller management table 900 that the device information storing unit 820 stores. FIG. 9B is a diagram illustrating an example of group-related information 910, that the device information storing unit 820 stores.

The connected controller management table 900 records a controller ID 901, certificate ID 902, shared key 903, and group key 904, for each controller 110 to which its device (the device 120) connects. The controller ID 901 is information for uniquely identifying the controller 110. The certificate ID 902 is a certificate ID of a public key certificate that the controller 110 has. The shared key 903 is data of a shared key shared with the controller 110. The group key 904 is data of a group key received from the controller 110. Note that the shared key is shared only with the SC, and not shared with all controllers.

The group-related information 910 records a controlling controller 911 and SC 912. The controlling controller 911 is the device ID of a controller 110 with which pairing has been performed. The SC 912 is the device ID of the SC of the group. At the time of shipping of the device, the SC 912 of the device 120 is set to a value indicating that no SC has been registered.

Returning to FIG. 8, description of the configuration of the device 120 will be continued. The authentication processing unit 830 functions to perform authentication processing with controllers 110 Details of the authentication processing performed by the authentication processing unit 830 will be described later.

The authentication information storing unit 840 stores the secret key and public key certificate of its device (the device 120). The authentication information storing unit 840 also stores a CRL and a digital certificate including the public key of a certifying authority. The public key certificate and CRL are the same as the public key certificate and CRL that the controller 110 stores, and accordingly description will be omitted here. Note that the key pair of the secret key and public key certificate, the CRL, and digital certificate have been embedded when the device 120 ships. The device history storing unit 850 stores device history information indicating operating history of its device (the device 120).

The functional units that are the device managing unit 810, device information storing unit 820, authentication processing unit 830, authentication information storing unit 840, and device history storing unit 850, typically are realized by a processor executing a program stored in memory.

The operating unit 860 is configured including a pairing button, and a control circuit that generates an interrupt signal in accordance with the pressing of this button and notifies the processor.

The communication unit 870 is realized by a communication LSI having communication functions. The communication unit 870 is connected to the HAN 130, and has functions of communicating with controllers 110 connected to the HAN 130 via the HAN 130.

The communication unit 870 performs encrypted communication as suitable using the group key received from the authentication processing unit 830 or the like to communicate with controllers 110.

Operations

Device registration processing, negotiation processing, SC handover processing, mutual authentication processing, shared key calculation processing, group key distribution/reception processing, group key updating processing, device history information transmission processing, and control command transmission processing, performed in the authentication system 100, will be described below in order.

Device Registration Processing

Device registration processing is processing when a controller and device pair. The device registration processing will be described below with reference to FIG. 10. Note that a device A and controller B are performing device registration processing in the following description.

(S1000) The user presses the pairing buttons that the device A and controller B have. Accordingly, the registration mode is activated in each of the device A and controller B.

(S1005) The device A transmits a connection request to the controller B. At this time, the device A transmits the device ID of the SC set in itself as well. In a case where no SC has been set to the device A, information to that effect is transmitted.

(S1010) The controller B determines whether or not negotiation processing is necessary, based on the device ID of the SC set to itself, and the device ID of the SC notified from the device A. In the authentication system 100, in a case where different controllers are set as the SC between the device A and controller B, negotiation processing is necessary. On the other hand, in a case where no SC has been set to the device A, or in a case where a common controller is set as the SC for the device A and controller B, there is no need to perform negotiation processing.

(S1015) In a case where determination has been made in step S1010 that negotiation processing is necessary, negotiation processing is performed between the controller set as the SC for the device A and the controller set as the SC for the controller B.

In a case where the controller B itself is going to perform the negotiation processing, the controller B transmits a negotiation request to the other party with which the negotiation processing is to be performed, and starts the negotiation processing. In a case where the controller B itself is not going to perform the negotiation processing, the controller B transmits a negotiation request to the two controllers that will perform the negotiation processing. Details of negotiation processing will be described later.

(S1020) The controller B transmits the device ID of the SC to the device A. In a case where determination has been made in step S1010 that negotiation processing is not necessary, the controller B notifies of the device ID of the SC set to itself. Ina case where determination has been made in step S1010 that negotiation processing is necessary, the controller B acquires the device ID of the controller newly decided to be the SC as a result of the negotiation processing, and transmits to the device A.

(S1025) The device A and controller B determine whether or not authentication is necessary between themselves and the SC. In a case where the device ID notified from the controller B in step S1020 and the device ID of the controller currently set to the device A as the SC differ, or in a case where the device A does not share the group key generated by the SC notified from the controller B or the like, the device A determines that authentication is necessary. In a case where the device ID transmitted the device A in step S1020 and the device ID of the controller currently set to the controller B as the SC differ, or in a case where the controller B does not share the group key generated by the SC transmitted to the device A or the like, the controller B determines that authentication is necessary.

(S1030, S1035) In a case where determination is made in step S1025 that authentication is necessary, the device A or controller B perform later-described mutual authentication processing and group key distribution/reception processing with the new SC.

(S1040) In a case where the mutual authentication processing and group key distribution/reception processing have ended successfully, the device A or controller B perform processing to join affiliation under the new SC. The device A sets the device ID of the new SC in the SC 912 of the group-related information 910 that the device information storing unit 820 stores. Alternatively, the controller B sets the device ID of the new SC in the SC 512 of the group-related information 510 stored in the device information storing unit 420. The device A or controller B transmit their own device IDs to the new SC, and the SC sets the received device ID in the group-related information 510 saved in the device information storing unit 420, as an affiliated device 513.

(S1045) In a case where the mutual authentication processing and group key distribution/reception processing of the device A or controller B has ended successfully, the device A transmits a pairing request to the controller B. The device A also transmits its own device ID at this time.

(S1050) Upon receiving the pairing request from the device A, the controller B performs pairing with the device A. That is to say, the controller B sets the device ID received from the device A along with the pairing request as a controlling device 511 in the group-related information 510 stored in the device information storing unit 420.

(S1055) Upon having perform pairing with the device A, the controller B transmits a pairing request to the device A. The controller B also transmits its own device ID at this time.

(S1060) Upon receiving the pairing request from the controller B, the device A performs pairing with the controller B. That is to say, the device A sets the device ID received from the controller B along with the pairing request as a controlling controller 911 in the group-related information 910 stored in the device information storing unit 820.

(S1065) Upon pairing with each other having ended successfully, the device A and controller B end the registration mode, and notify other devices and controllers belonging to the same group that pairing has been performed between the device A and controller B. This notification is encrypted using the group key shared in step S1035, and transmitted by broadcasting or the like. The above-described is device registration processing carried out between the device A and controller B.

Figure 11:
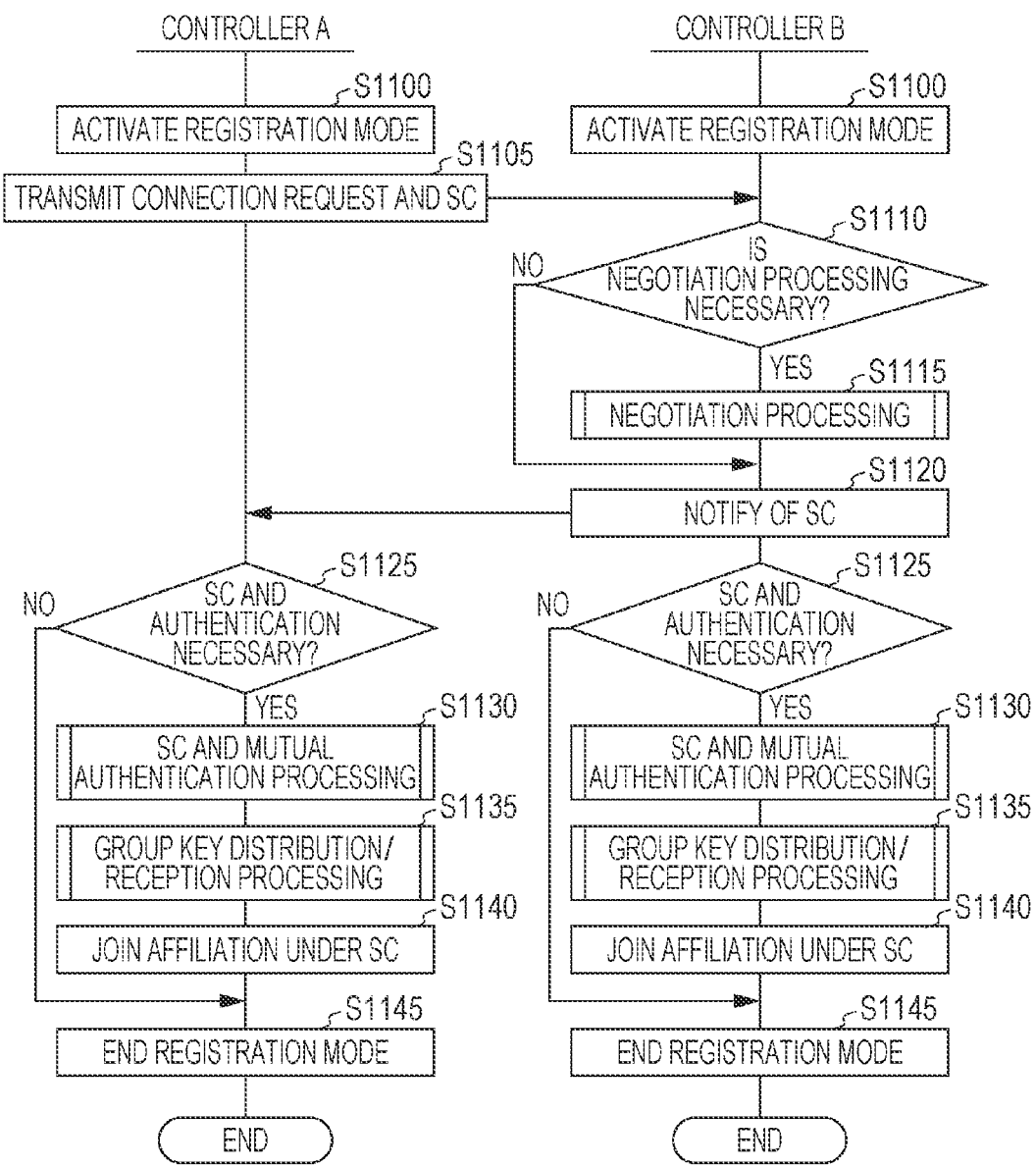
FIG. 11 is a sequence diagram illustrating an example of operations of an authentication system when a controller joins.

FIG. 11 illustrates processing in a case where device registration processing is carried out between a controller A and controller B. The device registration processing between the controller A and controller Bis the same as the device registration processing between the device A and controller B, except that the processing of steps S1045, S1050, S1055, and S1060 is not performed, so description will be omitted.

Negotiation Processing

Negotiation processing is processing performed when pairing has occurred between devices and controllers belonging to different groups, to decide which controller will be the SC after the two groups have been integrated.

Description of negotiation processing will be made below with reference to FIG. 12. The following is regarding negotiation processing between a controller A and controller B.

(S1200) The controller A transmits a negotiation request to the controller B.

(S1205) The controller A and controller B perform later-described mutual authentication processing.

(S1210) In a case where the mutual authentication processing has ended successfully, the controller A acquires attributes of the controllers from the public key certificate of the controller A and the public key certificate of the controller B obtained in the mutual authentication processing.

(S1215) The controller A determines whether or not the attribute of the controller A is "dedicated device" In a case where the attribute of the controller A is "dedicated device", the flow advances to step 31235; otherwise, to step S1220.

(S1220) The controller A determines whether or not the attribute of the controller B is "dedicated device". In a case where the attribute of the controller B is "dedicated device", the flow advances to step 31240; otherwise, to step 31225.

(S1225) The controller A determines whether or not the attribute of the controller A is "general-purpose device". In a case where the attribute of the controller A is "general-purpose device", the flow advances to step 31235; otherwise, to step 31230.

(S1230) The controller A determines whether or not the attribute of the controller B is "general-purpose device". In a case where the attribute of the controller B is "general-purpose device", the flow advances to step S1240; otherwise, to step 31235.

(S1235) The controller A decides the controller A to be the SC.

(S1240) The controller A decides the controller B to be the SC.

(S1245) The controller A notifies the selection results of the SC to the controller B.

(S1250) The controller A and controller B perform later-described SC handover processing.

This so far has been a description of negotiation processing. In the negotiation processing, data in the attribute item of the public key certificate is referenced, and the order of priority in becoming an SC is changed depending on whether the controller is a "dedicated device" that only has functions of controlling other devices, a "general-purpose device" that has other functions as well, or an "application" that runs on a PC, smartphone, or the like. If the attribute of the controller is "dedicated device", it is conceivable that the controller will have a function to always be in standby, so that processing can be quickly performed at any time. If the attribute of the controller is "general-purpose device", it is conceivable that the power may go off when everyone has left the house or gone to bed. If the attribute of the controller is "application", it is conceivable that the power may go off or the controller may disconnect from the network at any time. Accordingly, the order of priority to be the SC is set in the order of "dedicated device" "general-purpose device", and "application". In a case where the attributes of the two are the same, description is made here regarding a case where the controller that has commissioned the negotiation processing becomes the SC with priority, but the controller B that has received the commission for negotiation processing may become the SC with priority.

SC Handover Processing

Figure 13:
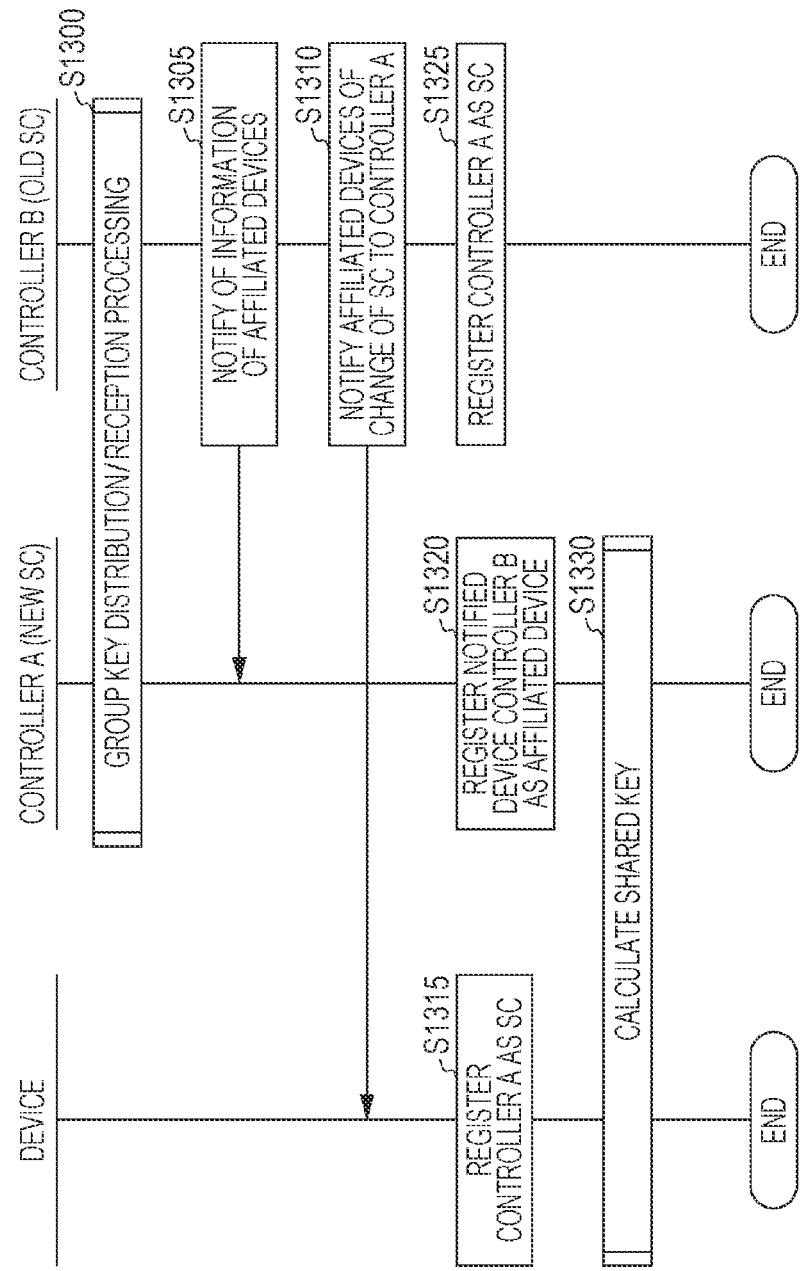
FIG. 13 is a sequence diagram illustrating an example of SC (Security Coordinator) handover processing.

SC handover processing is processing for the controller that had been the SC so far, to hand information that it had stored to the new SC, after the new SC has been decided by the negotiation processing. This SC handover processing will be described below with reference to FIG. 13. In the following description, the SC handover processing is carried out between the controller A that has newly become the SC (new SC) and the controller B that had been the SC so far (old SC).

(S1300) The new SC and old SC perform later-described group key distribution/reception processing. Here, the group key managed by the old SC is distributed to the new SC.

(S1305) The old SC transmits information of the affiliated devices under itself to the new SC. Specifically, data of the device ID 501, certificate ID 502, group key 504, and group key valid time 505, in the connected device management table 500, for each affiliated device 513 in the group-related information 510 of the old SC, is transmitted. The old SC transmits the public key certificate of the affiliated devices at this time as well. When transmitting the group key to the new SC, the old SC encrypts the group key using the shared key shared with the new SC and transmits.

(S1310) The old SC notifies the affiliated devices under itself that the SC has changed from the controller B to the controller A. The old SC also transmits the device ID and public key certificate of the controller A at this time.

(S1315) Upon receiving the notification of changing the SC and the device ID and public key certificate from the old SC, the affiliated devices under the old SC register the controller A as the SC. Specifically, the affiliated devices under the old SC register the device ID of the controller A that has been received in the SC 912 in the group-related information 910 stored in the device information storing unit 820. Further, the affiliated devices under the old SC add the record of the device ID of the controller A that has been received in the connected controller management table 900.

(S1320) The new SC uses the group key received in the group key distribution/reception processing in step S1300 and the device information received in step 31305 to update the connected device management table 500 and the group-related information 510 stored in the device information storing unit 420.

(S1325) The old SC registers the controller A, which is the new SC, as the SC. Specifically, the old SC sets the device ID of the controller A in the SC 512 of the group-related information 510 stored in the device information storing unit 420.

(S1330) The affiliated devices under the old SC and the new SC perform later-described shared key calculation processing. The timing for the shared key calculation processing may be immediately after the affiliated devices under the old SC register the new SC as the SC, or may be any time before the new SC updates the group key. This so far has been a description of SC handover processing.

Mutual Authentication Processing

Figure 14:
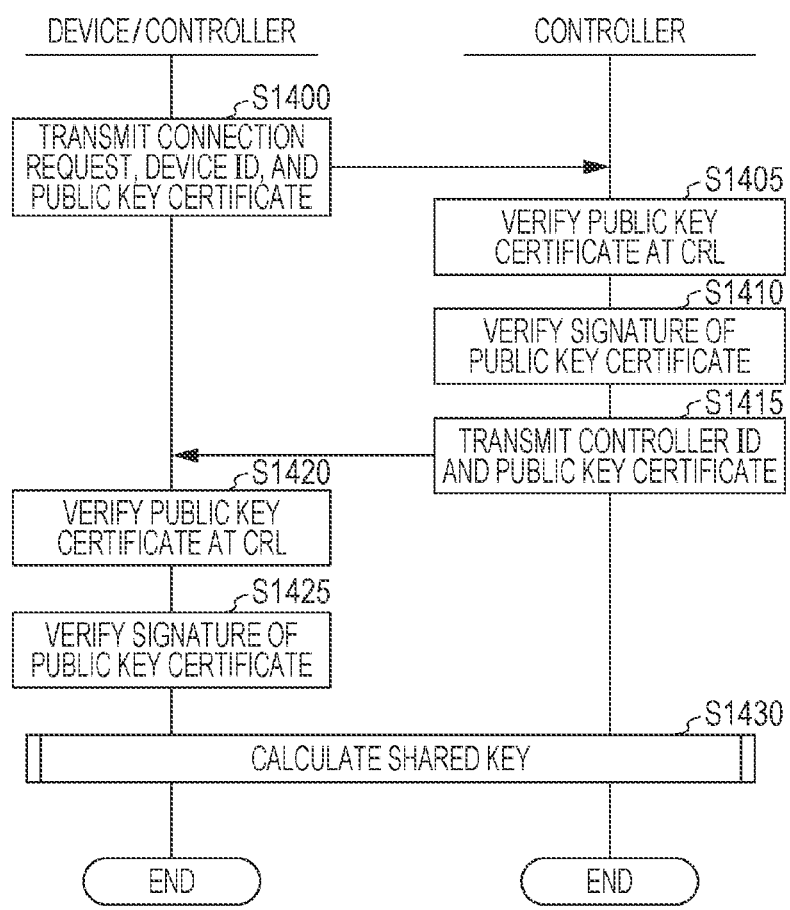
FIG. 14 is a sequence diagram illustrating an example of mutual authentication processing.

Next, mutual authentication processing between a device or controller and a controller will be described with reference to FIG. 14. Although description will be made below regarding mutual authentication processing between a device and a controller, the same processing is performed regarding mutual authentication processing between a controller and a controller.

(S1400) An authentication request is transmitted from the device to the controller. The device also transmits its own device ID and public key certificate at this time.

(S1405) The controller verifies that the certificate ID of the public key certificate of the device is not listed in the CRL stored in the authentication information storing unit 440. In a case where verification fails, the controller notifies the device of the error, and the processing ends.

(S1410) Upon confirming that the certificate ID is not listed in the CRL, the controller verifies the signature of the public key certificate of the device using a public key of a certificate authority. In a case where the verification fails, the controller notifies the device of the error and the processing ends. A commonly-used method such as Elliptic Curve Digital Signature Algorithm (ECDSA), RSA, DSA (Digital Signature Algorithm), or the like, may be used for the signature. Upon succeeding in verifying the signature of the public key certificate of the device, the controller creates a new record in the connected device management table 500, and registers the device ID and certificate ID of the device which is to be the other party in the mutual authentication processing.

(S1415) Upon succeeding in verifying the signature of the public key certificate of the device, the controller transmits its own device ID and public key certificate to the device.

(S1420) The device verifies that the certificate ID of the public key certificate of the controller is not listed in the CRL stored in the authentication information storing unit 840. In a case where verification fails, the device notifies the controller of the error, and the processing ends.

(S1425) Upon confirming that the certificate ID is not listed in the CRL, the device verifies the signature of the public key certificate of the controller using a public key of a certificate authority. In a case where the verification fails, the device notifies the controller of the error and the processing ends. Upon succeeding in verifying the signature of the public key certificate of the controller, the device creates a new record in the connected controller management table 900, and registers the device ID and certificate ID of the controller which is to be the other party in the mutual authentication processing.

(S1430) The device and controller perform later-described shared key calculation processing. This so far has been a description of mutual authentication processing.

Shared Key Calculation Processing

Figure 15:
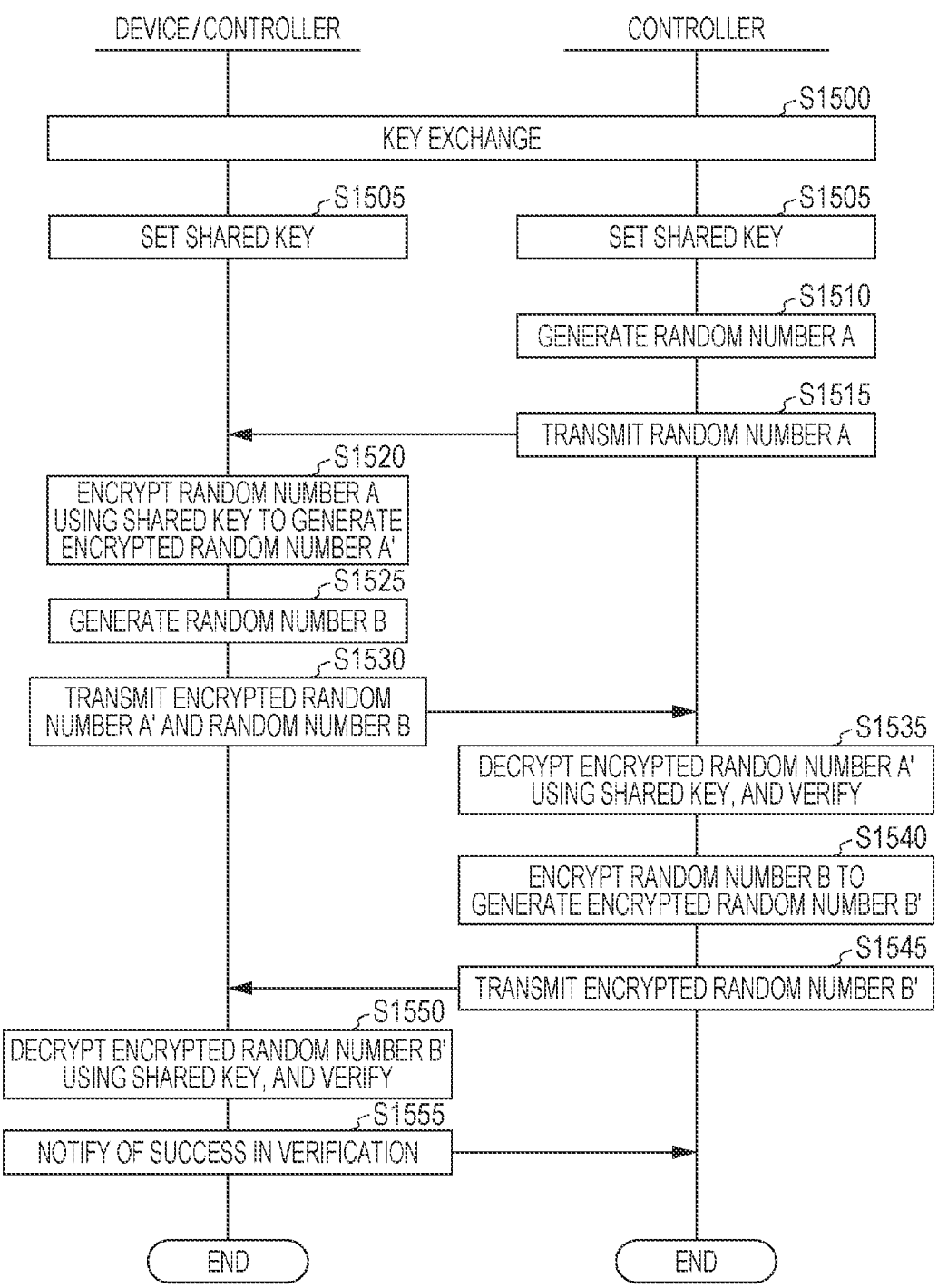
FIG. 15 is a sequence diagram illustrating an example of processing for calculating a shared key.

Next, the shared key calculation processing between the device or controller and controller will be described with reference to FIG. 15. Although description will be made below regarding shared key calculation processing between a device and a controller, the same processing is performed regarding shared key calculation processing between a controller and a controller.

(S1500) The device and controller perform key exchange. A common method such as Elliptic Curve Diffie-Hellman (ECDH) key exchange or the like may be used for the key exchange. ECDH can use either static keys or Ephemeral keys. While the present embodiment uses static keys, this is not restrictive, and an arrangement may be made where ephemeral keys are used.

(S1505) The device and controller calculate the shared key. Specifically, the device and controller calculate a hash value regarding a value shared in the key exchange in step S1500, and use the highest 128 bits of the calculated hash value as a shared key. Although the authentication system 100 uses 128-bit length AES (Advanced Encryption Standard) as the encryption method using the shared key, this is not restrictive, and other encryption methods may be used. The device registers the calculated shared key in the shared key 903 of the record for the corresponding controller in the connected controller management table 900. The controller registers the calculated shared key in the shared key 503 of the record for the corresponding device in the connected device management table 500. The corresponding controller and corresponding device are the device and controller that are the other parties in the shared key calculation processing.

(S1510, S1515) The controller generates a random number A, and transmits this to the device.

(S1520) The device encrypts the random number A received from the controller using the shared key calculated in step S1505, thereby generating an encrypted random number A'.

(S1525, S1530) The device generates a random number B, and transmits the encrypted random number A' and random number B to the controller.

(S1535) The controller decrypts the encrypted random number A' received from the device using the shared key calculated in step 31505, and performs verification whether this matches the random number A generated in step S1510. Ina case where verification fails, the controller notifies the device of the error, and the processing ends.

(S1540, S1545) The controller encrypts the random number B received from the device using the shared key calculated in step S1505, thereby generating an encrypted random number B', which is transmitted to the device.

(S1550) The device decrypts the encrypted random number B' received from the controller using the shared key calculated in step S1505, and performs verification whether this matches the random number B generated in step S1525. In a case where verification fails, the device notifies the controller of the error, and the processing ends.

(S1555) In a case where verification is successful, the device notifies the controller of the results of success in verification. This so far has been a description of shared key calculation processing.

Group Key Distribution/Reception Processing

Figure 16:
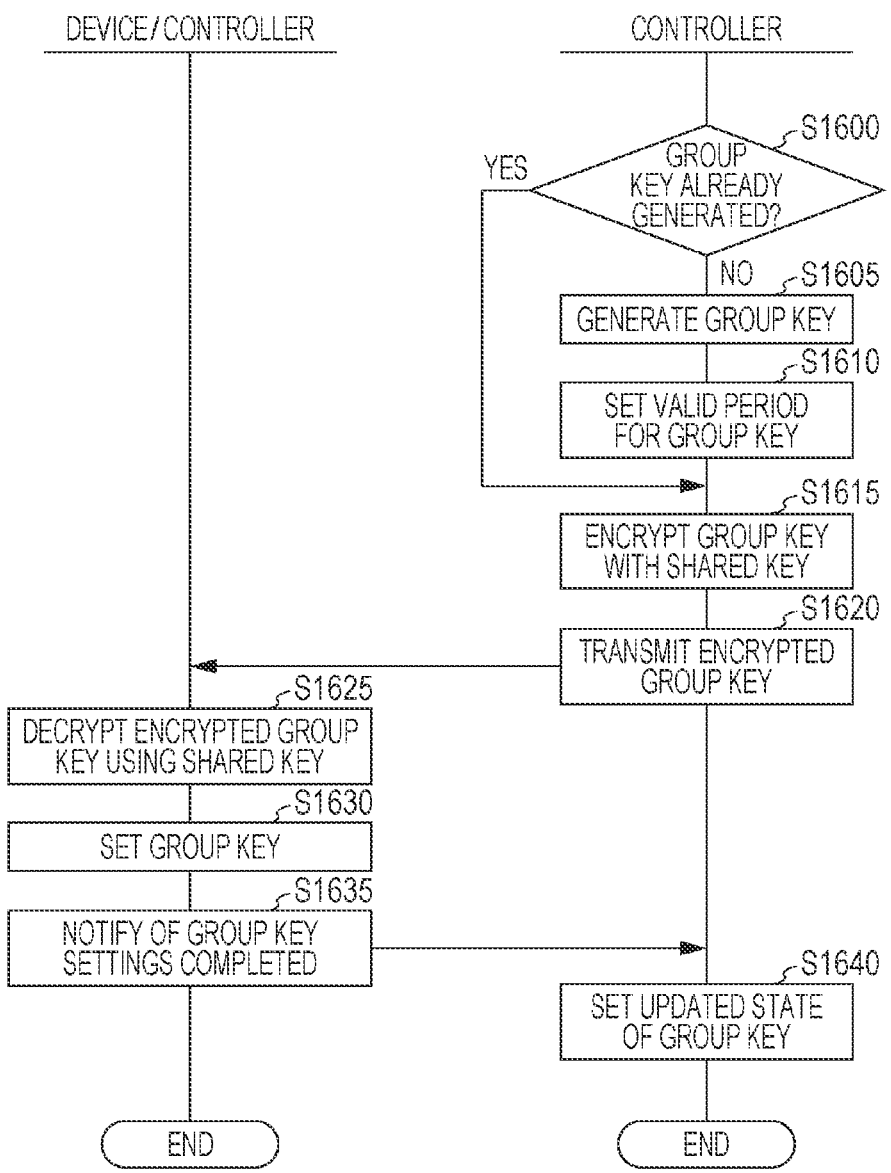
FIG. 16 is a sequence diagram illustrating an example of processing for group key distribution/reception.

Next, group key distribution/reception processing between a device or a controller that is not the SC, and a controller that is the SC, will be described with reference to FIG. 16. Although the description below is made regarding group key distribution/reception processing between a device and a controller that is the SC, this may be carried out between a controller that is not the SC and a controller that is the SC. In this case, the device is substituted with a controller that is not the SC.

(S1600) The controller determines whether or not a group key has already been generated. In a case where a group key has already been generated, the group key that has already been generated and the group key valid time are registered in the record for the corresponding device in the connected device management table 500 by the controller. The corresponding device here is the device serving as the other part in the group key distribution/reception processing.

(S1605, S1610) In a case where a group key has not already been generated, the controller generates a group key, and decides a valid time for the generated group key. Although the authentication system 100 uses 128-bit length AES as the encryption method using the group key, this is not restrictive, and other encryption methods may be used. The controller registers the generated group key and the group key valid time in the record for the corresponding device in the connected device management table 500.

(S1615, S1620) The controller encrypts the generated or already-generated group key using the shared key in the record for the corresponding device in the connected device management table 500, thereby generating an encrypted group key, which is transmitted to the device.

(S1625) The device decrypts the encrypted group key received from the controller using the shared key in the record of the corresponding controller in the connected controller management table 900.

(S1630) The device records the group key decrypted in step S1625 in the record for the corresponding controller in the connected controller management table 900.

(S1635) the device notifies the controller that group key registration has been completed.

(S1640) The controller registers a value, indicating that the group key has already been updated, to a group key updating flag 506 in the record for the corresponding device in the connected device management table 500. This so far has been a description of group key distribution/reception processing.

In a case of sharing a group key between controllers, the group key valid time may also be encrypted and transmitted when encrypting and transmitting the group key in steps S1615 and S1620. A controller receiving the encrypted group key valid time may register the received group key valid time in the connected device management table 500.

Group Key Updating Processing

Next, group key updating processing between the SC controller, and affiliated devices and controllers under the SC, will be described with reference to FIG. 17.

(S1700) The controller that has become the SC determines whether or not the group key valid time 505 of any one of the records in the connected device management table 500 is a predetermined value or lower. The following processing is not carried out until the group key valid time is the predetermined value or lower.

(S1705) When the group key valid time 505 of anyone of the records in the connected device management table 500 is a predetermined value or lower, the SC generates a new group key.

(S1710) The SC decides the valid time for the group key generated in step 31705. The valid time is decided to be a value such as 24 hours or 72 hours, for example.

(S1715) The SC registers a value indicating that the group key has not been updated, to the group key update flag 506 for all records in the connected device management table 500.

(S1720) The SC decides one device (or controller) for updating the group key, from the affiliated devices and controllers under itself.

(S1725) The SC generates an encrypted group key by encrypting the group key generated in step 31705, using the shared key in the record for the device (or controller) decided in step S1720 in the connected device management table 500.

(S1730) The SC transmits the encrypted group key generated in step S1725 to the device decided in step 31720, and updates the group key in the device (or controller) decided in step 31720. The processing of step S1730 will be described later in detail.

(S1735) The SC determines whether group key updating has been performed for all affiliated devices and controllers under itself. In a case where there is a device or controller regarding which the group key has not been updated, the flow returns to step 31720, while in a case where the group key has been updated for all affiliated devices and controllers underneath, the flow advances to step 31740.

(S1740) The SC registers the group key generated in step 31705 in the group key 504 in all records of the connected device management table 500. The SC registers the group key valid time that has been decided in the group key valid time 505 in all records in the connected device management table 500.

Next, the detailed processing of step 1730 will be described with reference to FIG. 18. Although the description below is made regarding processing between the device decided in step 31720 and a controller that is the SC, this may be carried out between a controller decided in step S1720 and a controller that is the SC. In this case, the device is substituted with a controller that is not the SC.

(S1800, S1805) The SC generates a random number A, and transmits the random number A to the device along with a group key update request.

(S1810) Upon receiving the group key update request and the random number A from the SC, the device uses the shared key in the record of the SC in the connected controller management table 900 to encrypt the random number A, thereby generating an encrypted random number A'.

(S1815, S1820) The device generates a random number B, and transmits the encrypted random number A' and random number B to the SC.

(S1825) The SC decrypts the encrypted random number A' received from the device using the shared key of the record for the corresponding device in the connected device management table 500, and verifies whether or not this matches the random number A generated in step S1800. In a case where verification fails, the SC notifies the device of the error, and the processing ends.

(S1830, S1835) The SC uses the shared key of the record for the corresponding device in the connected device management table 500 to encrypt the random number B received from the device, thereby generating an encrypted random number B' and transmits this to the device.

(S1840) The device decrypts the encrypted random number B' received from the SC using the shared key of the record for the SC in the connected controller management table 900, and verifies whether or not this matches the random number B generated in step S1815. Ina case where verification fails, the device notifies the SC of the error, and the processing ends.

(S1845) In a case where verification is successful, the device notifies the SC of the results of success in verification.

(S1850) Upon receiving the results of successful verification from the device, the SC transmits the encrypted group key generated in step S1725 to the device.

(S1855) The device decrypts the encrypted group key received from the SC using the shared key of the record for the SC in the connected controller management table 900.

(S1860) The device registers the decrypted group key in the group key 904 in all records of the connected controller management table 900.

(S1865) The device transmits a group key update completion notification to the SC.

(S1870) Upon receiving a group key update completion notification from the device, the SC registers a value indicating that the group key is already updated, in the group key update flag 506 of the record for the corresponding device in the connected device management table 500. This so far has been a description of group key updating processing.

Device History Information Transmission Processing

Next, processing for transmitting device history information from a paired device to a controller will be described with reference to FIG. 23. Note that this device history information transmission processing is performed periodically or non-periodically.

(S2300) The device encrypts the device history information stored in the device history storing unit 850 using the group key in the connected controller management table 900, thereby generating encrypted history information.

(S2305) The device transmits the encrypted history information generated in step S2300 to the controller registered as the controlling controller 911 in the group-related information 910.

(S2310) Upon receiving the encrypted device history information from the device with which it has been paired, the controller decrypts the encrypted device history information using the group key in the record for the corresponding device in the connected device management table 500.

This so far has been a description of device history information transmission processing. Note that the controller may transmit the decrypted device history information to an external server or the like.

Control Command Transmission Processing

Next, processing for transmitting a control command from a controller to a device that have been paired will be described with reference to FIG. 24. Note that this control command transmission processing is performed periodically or non-periodically.

(S2400) The controller generates control commands for the paired devices based on a control request from an external server or the like.

(S2405) The controller encrypts the control commands that have been generated, using the group key in the record for the corresponding device in the connected device management table 500, thereby generating encrypted control commands.

(S2410) The controller transmits the encrypted control commands that have been generated to the paired devices. In a case of transmitting the same control command encrypted by the same group key to multiple devices, the controller transmits by broadcast communication.

(S2415) Upon receiving the encrypted control commands from the controller with which they have been paired, the devices decrypt using the group key in the connected controller management table 900.

(S2420) The devices execute the decrypted control commands. This so far has been a description of control command transmission processing.

Figure 3:
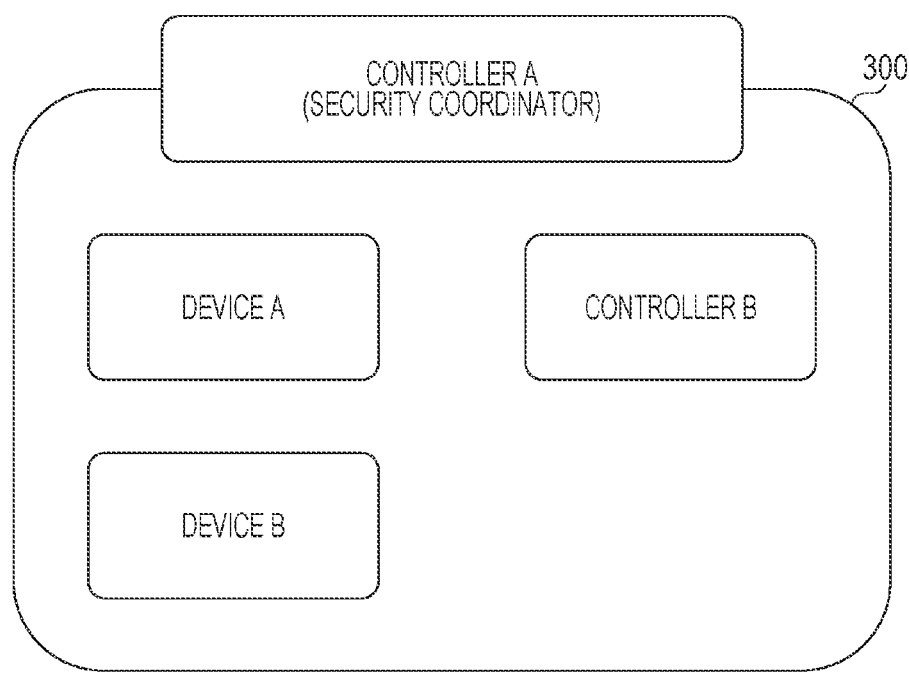
FIG. 3 is a diagram illustrating an example of a group configuration after integration.

Regarding Updating Connected Device Management Table and Group-Related Information The authentication system 100 operates while performing group integration of the group configuration such as from the state illustrated in FIG. 2 to the state illustrated in FIG. 3, by appropriately carrying out the above-described device registration processing, negotiation processing, SC handover processing, mutual authentication processing, shared key calculation processing, and group key distribution/reception processing.

Now, assumption will be made that the controller A and controller B perform device registration processing in a state where the group configuration within the HAN is as illustrated in FIG. 2, and a group configuration such as illustrated in FIG. 3 has been achieved through group integration. Updating of the connected device management table 500 and group-related information 510 of the controllers, and the connected controller management table 900 and group-related information 910 of the devices, will be described with reference to FIGS. 19A through 22D.

FIG. 19A is a diagram illustrating the connected device management table 500 stored in the controller A when the group configuration within the HAN is in the state in FIG. 2. FIG. 19B is a diagram illustrating the group-related information 510 stored in the controller A when the group configuration within the HAN is in the state in FIG. 2. FIG. 19C is a diagram illustrating the connected device management table 500 stored in the controller B when the group configuration within the HAN is in the state in FIG. 2. FIG. 19D is a diagram illustrating the group-related information 510 stored in the controller B when the group configuration within the HAN is in the state in FIG. 2.

FIG. 20A is a diagram illustrating the connected controller management table 900 stored in the device A when the group configuration within the HAN is in the state in FIG. 2. FIG. 20B is a diagram illustrating the group-related information 910 stored in the device A when the group configuration within the HAN is in the state in FIG. 2. FIG. 20C is a diagram illustrating the connected controller management table 900 stored in the device B when the group configuration within the HAN is in the state in FIG. 2. FIG. 20D is a diagram illustrating the group-related information 910 stored in the device B when the group configuration within the HAN is in the state in FIG. 2.

FIG. 21A is a diagram illustrating the connected device management table 500 stored in the controller A after SC handover processing. FIG. 21B is a diagram illustrating the group-related information 510 stored in the controller A after SC handover processing. FIG. 21C is a diagram illustrating the connected device management table 500 stored in the controller B after SC handover processing. FIG. 21D is a diagram illustrating the group-related information 510 stored in the controller B after SC handover processing.

FIG. 22A is a diagram illustrating the connected controller management table 900 stored in the device A after SC handover processing. FIG. 22B is a diagram illustrating the group-related information 910 stored in the device A after SC handover processing. FIG. 22C is a diagram illustrating the connected controller management table 900 stored in the device B after SC handover processing. FIG. 22D is a diagram illustrating the group-related information 910 stored in the device B after SC handover processing.

Comparing FIG. 19A and FIG. 21A, added to the connected device management table 500 of the controller A are the record of the controller B (record with device ID "004") and the record of the device B (record with device ID "002") that have newly become affiliated thereunder. The record of the controller B is the record added when mutual authentication was performed between the controller A and controller B in the negotiation processing between the controller A and controller B (see step 31205 in FIG. 12 and steps S1410 and S1425 in FIG. 14). The record of the device B is the record added when device information notified from the old SC was registered in the SC handover processing from the controller B (old SC) to the controller A (new SC) (see steps 1320 and S1330 in FIG. 13).

Comparing FIG. 19B and FIG. 21B, added to the affiliated devices 513 in the group-related information 510 of the controller A are the device IDs of the controller B and device B that have newly become affiliated thereunder. This addition has been performed when registering the devices and old SC notified from the old SC as affiliated devices thereunder in the SC handover processing from the controller B (old SC) to the controller A (new SC) (see step S1320 in FIG. 13).

Comparing FIG. 19C and FIG. 21C, added to the connected device management table 500 of the controller B is the record of the controller A (record with device ID "003") that has newly become the SC. The record of the controller A is the record added when mutual authentication was performed between the controller A and controller B in the negotiation processing between the controller A and controller B (see step S1205 in FIG. 12 and steps S1410 and S1425 in FIG. 14). Note that the reason why the values of group key valid time 505 and group key update flag 506 in the connected device management table 500 of the controller B are shown as "-" in FIG. 21C is because the controller B is no longer the SC, and accordingly this is information that does not have to be managed.

Comparing FIG. 19D and FIG. 21D, the SC 512 in the group-related information 510 of the controller B has been changed from the device ID of the controller B to the device ID of the controller A. This change has been performed when registering the new SC in the SC handover processing from the controller B (old SC) to the controller A (new SC) (see step S1325 in FIG. 13). Note that the reason why the value of affiliated device 513 in the group-related information 510 of the controller B is shown as "-" in FIG. 21D is because the controller B is no longer the SC, and accordingly this is information that does not have to be managed.

Comparing FIGS. 20A and 20B with FIGS. 22A and 22B, there is no change in the connected controller management table 900 and the group-related information 910 of the device A. This means that the group integration this time did not change the SC of the device A.

Comparing FIGS. 20C and 20D with FIGS. 22C and 22D, the record of the device ID of the controller A that has newly become the SC is added to the connected controller management table 900 of the device B, and the SC 912 of the group-related information 910 is changed from the device ID of the controller B that is the old SC to the device ID of the controller A that is the new SC. This change has been performed when registering the controller A as the new SC after the device B that was affiliated under the old SC received the SC change notification from the old SC, in the SC handover processing from the controller B (old SC) to the controller A (new SC) (see steps S1315 and S1330 in FIG. 13).

Thus, as illustrated in FIGS. 19A through 22D, the connected device management tables 500 and group-related information 510 of the controllers, and the connected controller management tables 900 and group-related information 910 of the devices, are updated.

Flow for New Controller to Join

Description will be made here regarding a flow starting from a state where none of controllers and devices in a HAN have been paired, to where a group is configured by performing the above-described device registration processing, negotiation processing, SC handover processing, mutual authentication processing, shared key calculation processing, group key distribution/reception processing, and group key updating processing, and further a new controller has joined the group.

First, assumption will be made that a controller A and device A, that are not paired with any device or controller, exist within the HAN. In this state, the SC of the controller A is set to the controller A, and no SC has been set to the device A.

Figure 10:
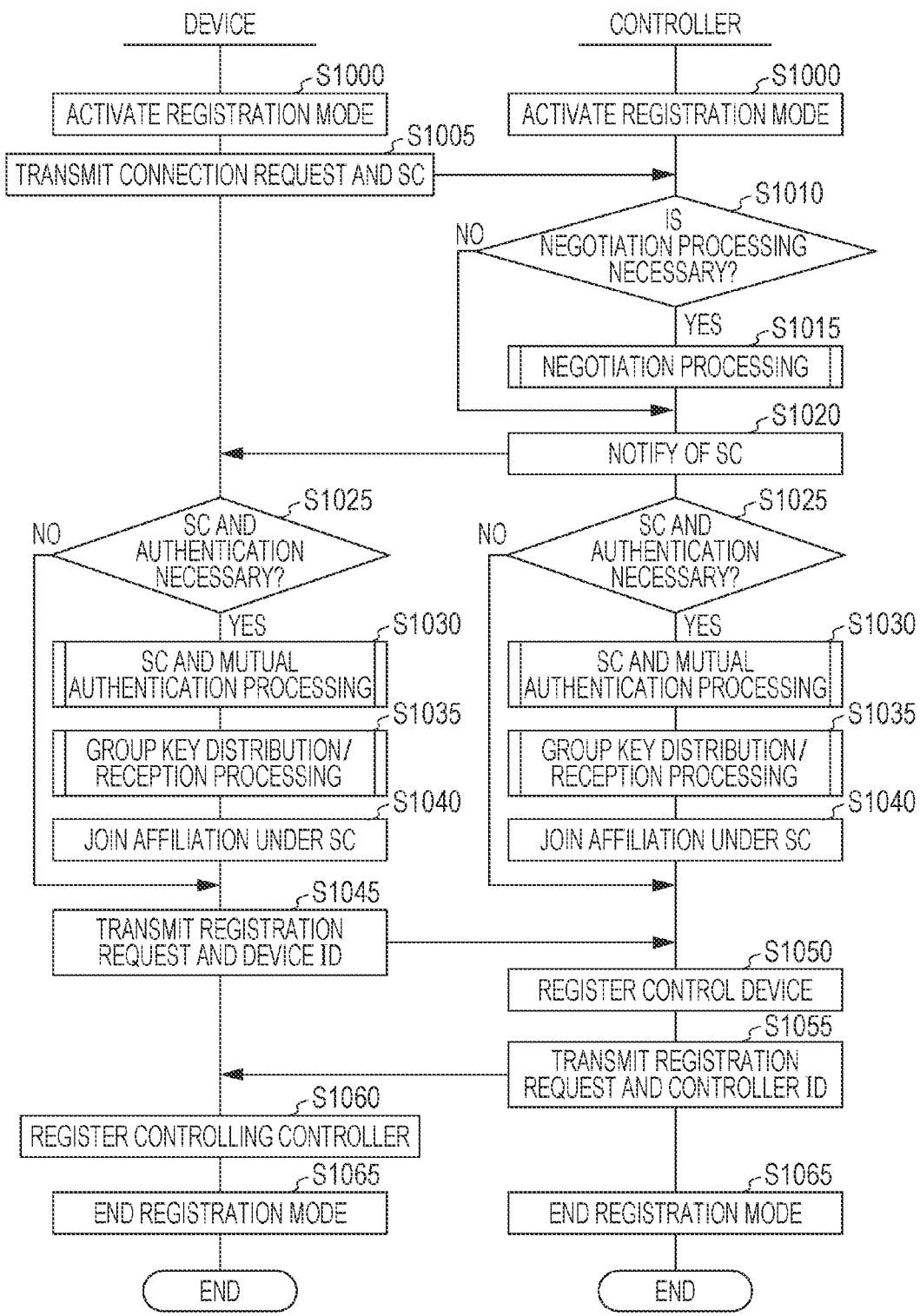
FIG. 10 is a sequence diagram illustrating an example of operations of an authentication system at the time of registering a device.

The device registration processing illustrated in FIG. 10 described above is performed between the controller A and device A by paring operations between the controller A and device A by the user. In this device registration processing, no SC has been set for the device A, so no negotiation processing is performed, and the controller A set as the SC of the controller A is notified to the device A as anew SC (see steps S1010, S1020). The device A now needs authentication with the SC due to the SC having been newly registered, and accordingly performs mutual authentication processing with the controller A that is the SC (see steps S1025, S1030). This mutual authentication processing between the device A and controller A will be referred to as first mutual authentication.

After the first mutual authentication, the device A and controller A perform group key distribution/reception processing, and a group key is shared between the device A and controller A (see step S1035). The group key shared at this time will be referred to as a first group key.

The device A then joins into affiliation under the controller A, and a group made up of the device A and controller A is formed (see step S1040). Thereafter, each time the valid time of the first group key reaches the predetermined value or lower, the controller A performs the group key updating processing illustrated in FIGS. 17 and 18, and updates the first group key that is the group key shared within the group.

Assumption will be made that a controller B, that has not been paired with any device, is newly connected to the HAN. At this time, the SC of the controller B is set to controller B.

The device registration processing illustrated in FIG. 11 is performed between the controller A and controller B, by the user performing the pairing operations between the controller A and controller B. In this device registration processing, the SC set to the controller A and the SC set to the controller B differ, so negotiation processing occurs between the SC of the controller A and the SC of the controller B (see steps S1110, S1115). In this case, the controller A and controller B perform negotiation processing.

Figure 12:
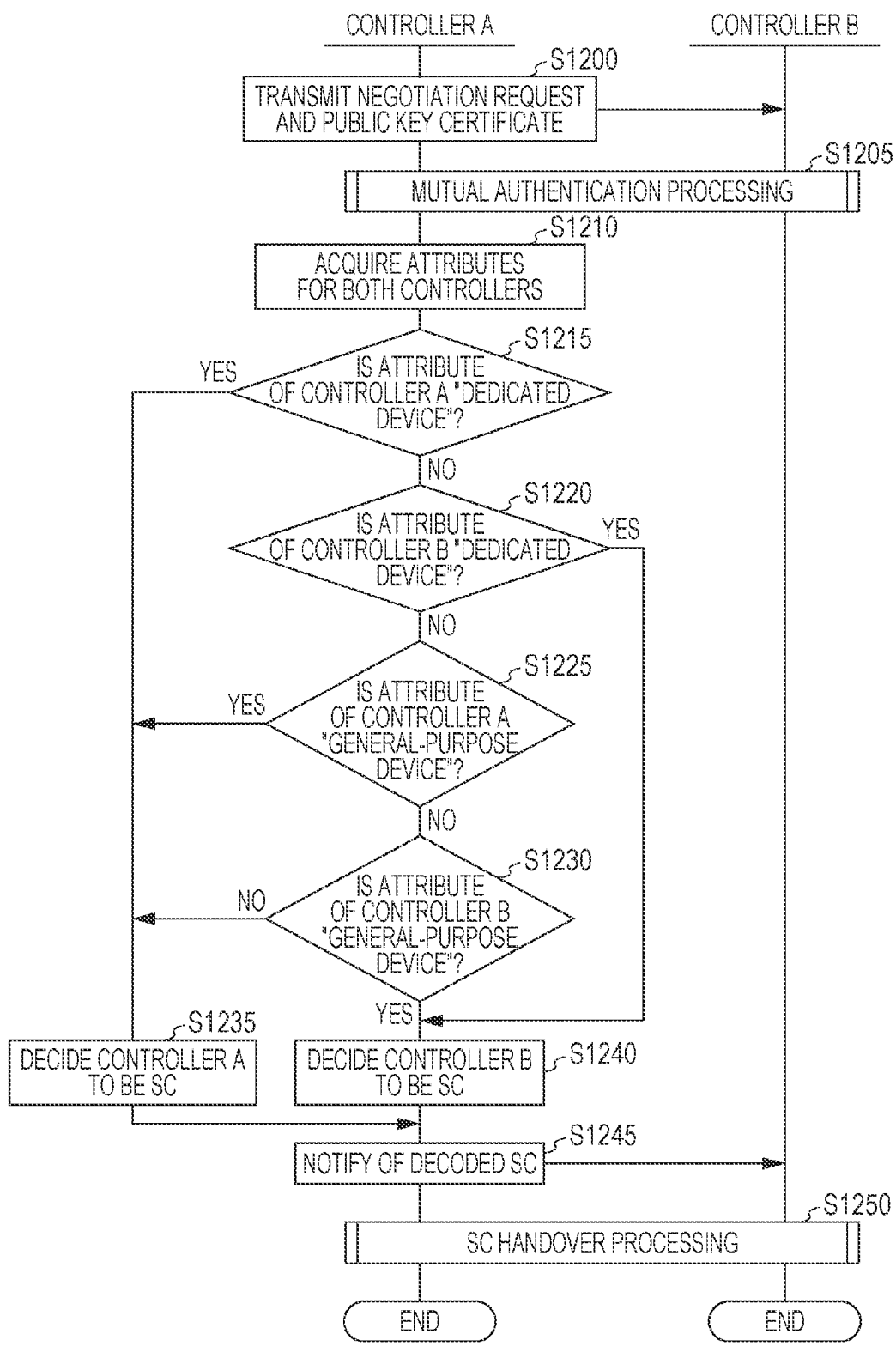
FIG. 12 is a sequence diagram illustrating an example of negotiation processing.

Mutual authentication processing between the controller A and controller B is performed in the negotiation processing (see step S1205 in FIG. 12). This mutual authentication processing performed between the controller A and controller B will be referred to as second mutual authentication. After the second mutual authentication, which one of the controller A and controller B is to be the SC is decided.

When the controller B becomes the SC, SC handover processing from the controller A to the controller B is performed. In the SC handover processing, group key distribution/reception processing is performed where the first group key generated by the controller A that is the old SC is shared between the controller A that is the old SC and the controller B that is the new SC (see step S1300 in FIG. 13). At this time, the controller A, controller B, and device A share the first group key that is the group key generated by the controller A, and the controller A, controller B, and device A can perform encrypted communication using the first group key until the new SC performs group key updating processing.

Figure 17:
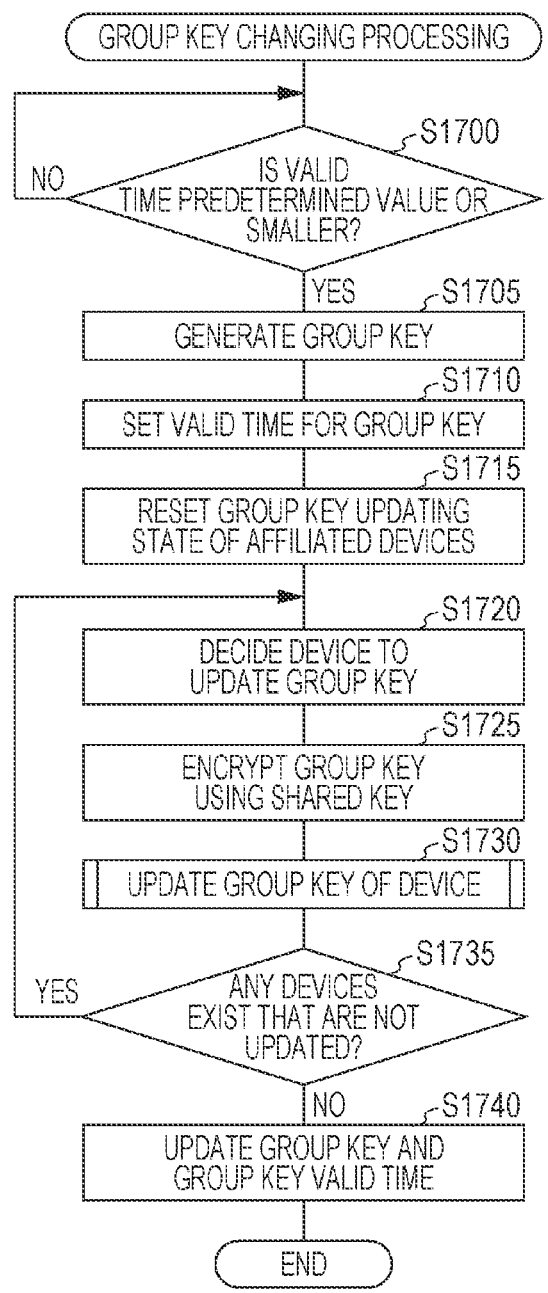
FIG. 17 is a sequence diagram illustrating an example of group key updating processing.
Figure 18:
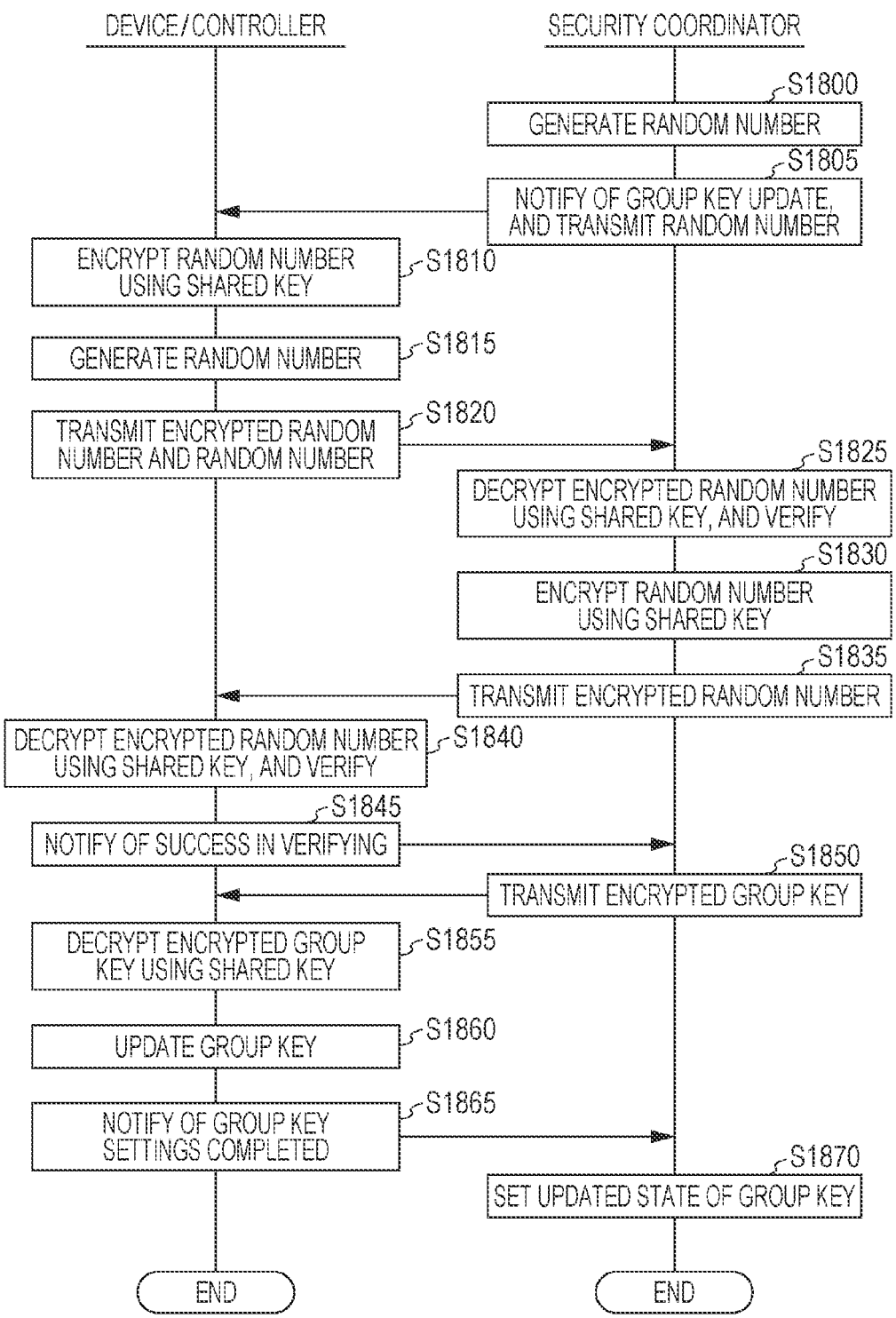
FIG. 18 is a sequence diagram illustrating an example of group key updating processing.

When the valid time of the first group key reaches the predetermined value or lower, the group key updating processing illustrated in FIGS. 17 and 18 is performed. In the group key updating processing, the controller B that is the SC generates a group key. This group key will be referred to as a second group key (see step S1705 in FIG. 17). The controller B then performs mutual authentication using shared key and random numbers with each of the controller A and device A, that are affiliated devices thereunder (see steps S1800 through S1845 in FIG. 18). This mutual authentication using the shared key and random numbers will be referred to as third mutual authentication. The controller B shares the second group key with the controller A and device A, with which the third mutual authentication has been successful.

As described above, in a case where the SC is handed over to a controller that has newly joined the group, and the group key is updated by the new SC, the first mutual authentication, second mutual authentication, and third mutual authentication are performed.

Advantages of First Embodiment

In the first embodiment, a group is formed of a controller and device, and in a state where there are multiple controllers included in one group, the multiple controllers perform negotiation processing. The controllers negotiate using the attributes of the controllers listed in the public key certificates, and thus can decide a controller, regarding which states in which the power is off or the controller is disconnected from the network do not readily occur, as the SC with priority. Accordingly, in cases where a new device or controller joins the group, and in cases where there is need to update the group key, the group key can be quickly shared within the group.

Also, in the first embodiment, when the SC is changed among controllers, SC handover processing is performed from the old SC to the new SC, and the new SC takes over the authentication results that the old SC had performed with affiliated devices thereunder. Accordingly, authentication using public key certificates between the new SC and old SC can be omitted. As a result, the processing load on devices and controllers can be reduced.

Further, in the first embodiment, when the SC is changed among controllers, the group key generated by the old SC is transmitted from the old SC to the new SC. Accordingly, the new SC can use the group key generated by the old SC to perform encrypted broadcast communication to affiliated devices under the old SC, using the group key generated by the old SC, even before a group key generated by the new SC is distributed.

Modifications

Although the authentication system using the authentication method according to the present disclosure has been described by way of embodiment, the following modifications may also be made, and the present disclosure is not restricted to the authentication system as described above in the embodiment.

First Modification

Figure 25:
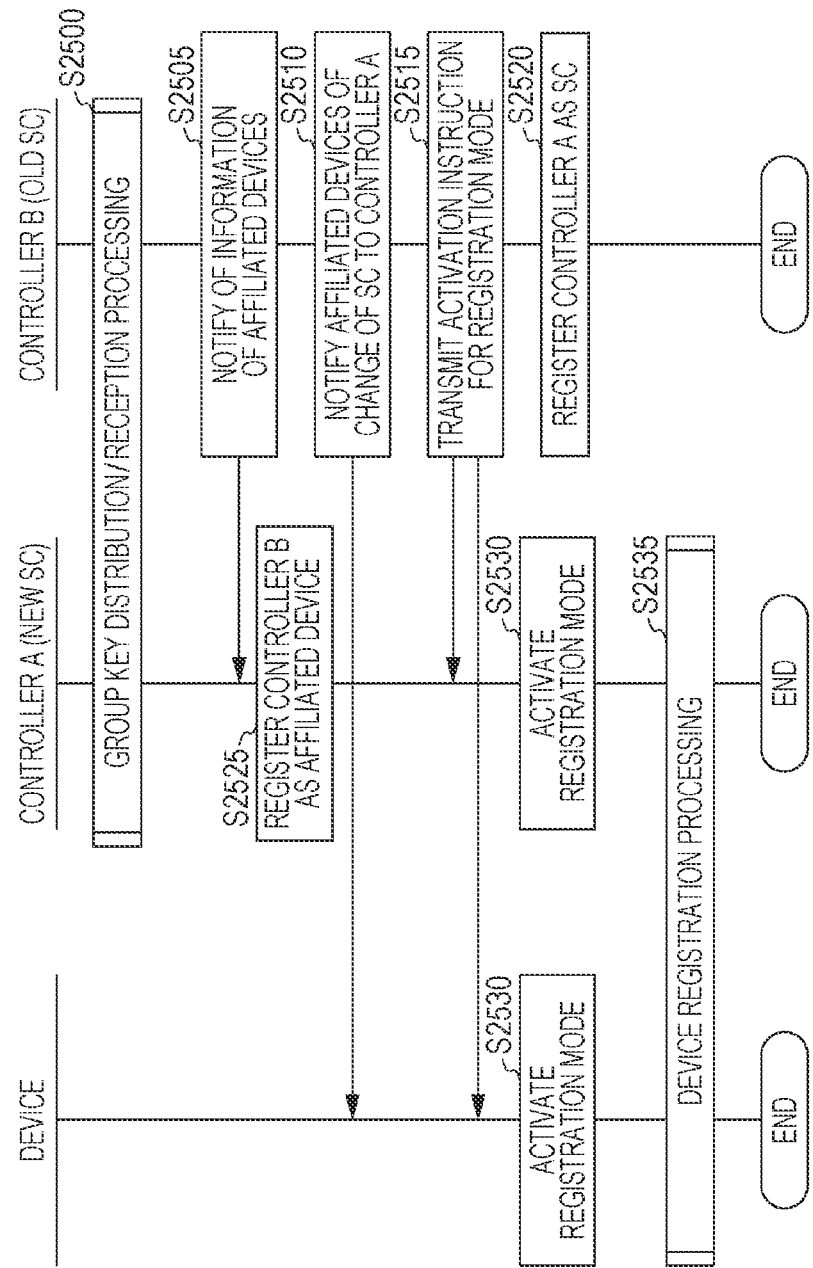
FIG. 25 is a sequence diagram illustrating an example of SC handover processing.

The SC handover processing in the first embodiment may be modified as follows. FIG. 25 is a diagram illustrating a modification of SC handover processing. The processing of steps S2500, S2505, S2510, S2520, S2525, and S2535 is the same as processing in steps S1300, S1305, S1310, S1320, S1325, and 31330 in the SC handover processing according to the first embodiment, so description thereof will be omitted.

(S2515) The controller B that is the old SC transmits an activation instruction for the registration mode to the affiliated devices thereunder and the controller A that is the new SC.

(S2530) Upon receiving the activation instruction for the registration mode from the controller B, the controller A and the affiliated devices under the old SC activate the registration mode.

(S2535) The controller A sequentially performs device registration processing with the affiliated devices under the old SC. The device registration processing is the same as the processing in steps S1005 through S1065 in FIG. 10, so description will be omitted here.

In the SC handover processing illustrated in FIG. 25, when the SC has been changed, an activation instruction for the registration mode is transmitted from the old SC to the affiliated devices under the old SC and the new SC, so the new SC and the affiliated devices under the old SC activate the registration mode. Accordingly, device registration processing can be performed between the affiliated devices under the old SC and the new SC even without the user manually activating the registration mode, improving the ease of use for the user.

Second Modification

In the SC handover processing according to the first embodiment, when the old SC notifies the new SC of information of affiliated devices thereunder, the public key certificates of the affiliated devices thereunder are also transmitted to the new SC. However, the present disclosure is not restricted to this, and instead of the old SC transmitting the public key certificates of each of the affiliated devices thereunder to the new SC, each of the affiliated devices that has received the SC changing notification from the old SC may transmit the public key certificate stored therein to the new SC. In this case, each of the affiliated devices under the old SC may encrypt the public key certificate using the group key generated by the old SC and transmit to the new SC.

Third Modification

Description was made regarding the negotiation processing in the first embodiment that the classifications according to controller functions are described as attributes of devices described in the public key certificates, and the controller to become an SC is decided according to the classification items ("dedicated device", "genera-purpose device" "application"). However, the negotiation processing according to the present disclosure is not restricted to this. For example, version information of communication format or authentication format may be described as attributes of devices described in the public key certificates, and the controller to become an SC may be decided by the controller having a public key certificate in which is described the newest version No. for the communication format or authentication format out of the controllers participating in the negotiation processing being decided to be the SC. Alternatively, a controller having version information indicating a greater number of compatible devices or compatible functions may be decided to be the SC. Accordingly, a controller having the newest functions, or a controller having a greater number of compatible devices or compatible functions can be decided to be the SC.

Also, an arrangement may be made where the greatest number of devices that can be paired with the controller is described as a device attribute in the public key certificate, and the controller that has the largest number out of the controllers participating in the negotiation processing may be decided to be the SC. Accordingly, a controller that is capable of pairing with a greater number of devices can be decided to be the SC.

Also, an arrangement may be made where the type of communication function (cabled, dedicated wireless, general purpose wireless, and near-field) that the controller handles is described as a device attribute in the public key certificate, and the controller to be the SC is decided by the type. In this case, the priority may be set for priority to become the SC in the order of "cabled" "dedicated wireless", "general purpose wireless", and "near-field". This order is an order by which a controller corresponding to communication where the probability of being connected to the HAN is the highest (the frequency of not being connected to the HAN is low) is more likely to be the SC. Accordingly, a controller which has a high probability of being connected to the HAN when the SC is needed, can be decided to be the SC.

Also, an arrangement may be made where the type of power source (all-time power supply, periodic power supply, short-term power supply) is described as a device attribute in the public key certificate, and the controller to be the SC is decided by the type. In this case, the priority may be set for priority to become the SC in the order of "all-time power supply" "periodic power supply", and "short-term power supply". This order is an order by which a controller where the probability of being operating is the highest (the frequency of the power being off is low) is more likely to be the SC. Accordingly, a controller which has a high probability of being on when the SC is needed, can be decided to be the SC. Here, an "all-time power supply" device is a device which needs power to be supplied at all times, such as a dedicated controller or log collecting device for controlling devices, a distribution board, a power breaker, a refrigerator, an air conditioner, a solar power generating device, a battery, a telephone device, a broadband router, a terminator, and so forth. A "periodic power supply" is a device such as a television set or video recording device, an audio device, a room light, and so forth. A "short-term power supply" device is a device such as a microwave oven, an electric oven, a washing machine, a vacuum cleaner, a rice cooker, and so forth.

Also, an arrangement may be made where the mode of usage (stationary (fixed), stationary (movable), portable, worn) is described as a device attribute in the public key certificate, and the controller to be the SC is decided by the form. In this case, the priority may be set for priority to become the SC in the order of "stationary (fixed)", "stationary (movable)", "portable", and "worn". This order is an order by which a controller where the probability of being moved is the highest is less likely to be the SC. It is conceivable that the less the device moves, the less the communication environment will change, and the probability of communication being cut off is low. Also, it is easier to secure power for a device that does not move. Accordingly, a controller that is not easily cut off from communication and a power source can easily be secured can be decided as being the SC.

Further, instead of deciding the SC according to the device attribute described in the public key certificate, the SC may be decided by the state of the device at that time, for example, the controller that has the greatest number of devices with which it is paired during the negotiation processing may become the SC. Accordingly, the number of devices needing re-authentication due to the SC changing can be reduced. Also, the controller that has been operating for the least number of hours may be the SC, or the controller that has the most recent date of manufacture may be the SC. Accordingly, the possibility that authentication processing cannot be performed due to SC malfunction can be reduced. Also, the above standards may be combined to decide the security coordinator.

Fourth Modification

The negotiation processing according to the first embodiment has been described as being automatically performed by the controllers. However, the negotiation processing according to the present disclosure may be such that the controllers present controllers to the user as candidates for the SC, and the user selects a controller to be the SC from the presented candidates. At this time, all controllers that can be the SC may be presented as candidates, or may be presented as candidates when there are multiple controllers selected according to the standards in the first embodiment or the third modification.

Figure 26:
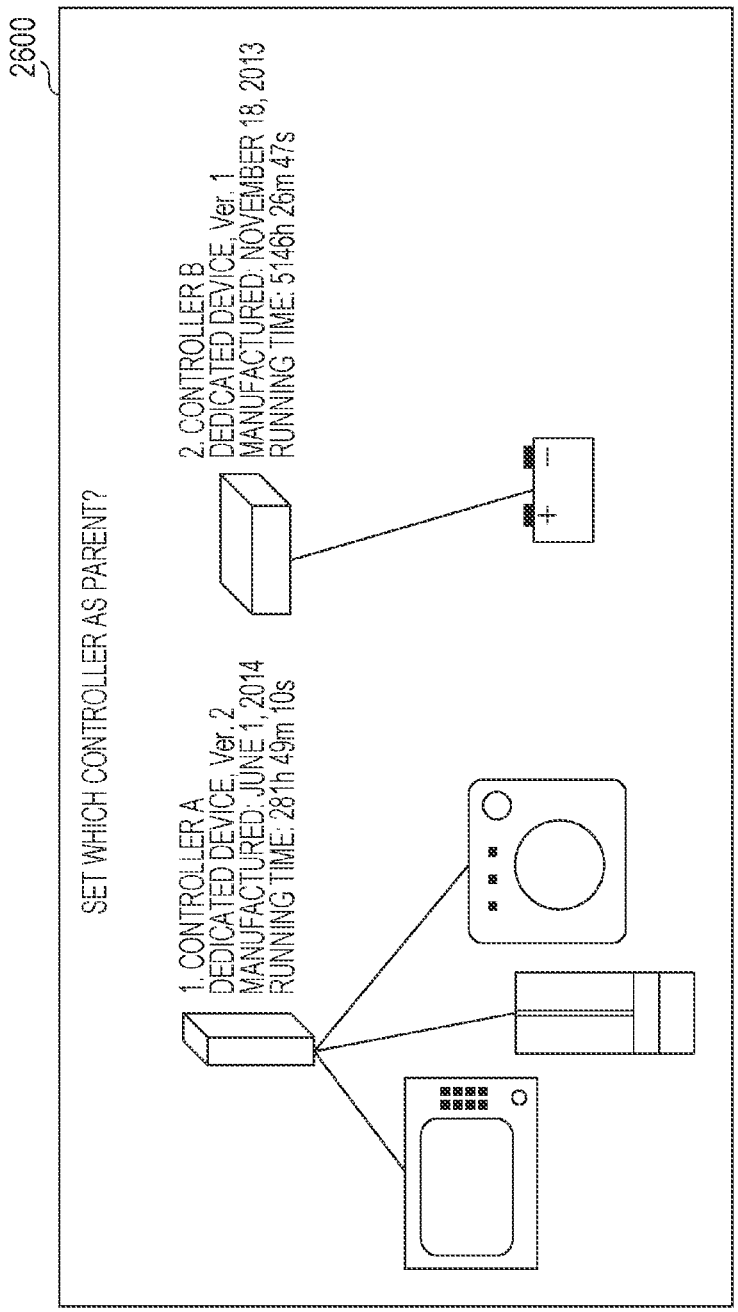
FIG. 26 is a diagram illustrating an SC selection screen.

FIG. 26 is a display example at the display unit of a controller according to the present modification. FIG. 26 shows that there are two controllers that are SC candidates, with different home appliances having been registered to each. Also displayed are the attributes described in the public key certificate of each of the two controllers (classification according to function of controller, version information of communication format, authentication format, etc., date of manufacture, and running time). The user decides a controller to serve as the SC, in accordance with the presented information. The user decision is input here by, for example, touching a picture in the screen of the decided controller, inputting a number (1 or 2) given to each of the controllers from an input device, or inputting an identification symbol (A or B) of the controller from an input device. Any device can serve as the input device as long as the intent of the user can be communicated to the controller, and may be a physical key input device, icons presented on a touch panel, a device that gives instructions by audio, a device that gives instructions by gestures, or a device that gives instructions by line of sight.

Fifth Modification

While the first embodiment performs challenge-response authentication where random numbers are encrypted and verified using a shared key in steps S1510 through S1555, this is not restrictive, and an authentication format described in RFC 5191 may be used to perform authentication. RFC 5191 is described in IETF: RFC 5191: Protocol for Carrying Authentication for Network Access (PANA), Internet Engineering Task Force (IETF), May 2008, and accordingly will not be described here. Extensible Authentication Protocol-pre-shared key (EAP-PSK) may be used in RFC 5191 at this time. Alternatively, the group key may be derived using an extended master session key (EMSK) derived as the result of EAP-PSK negotiation. Further, HMAC-SHA2-256 may be used as the key derivation function.

Sixth Modification

While the first embodiment performs challenge-response authentication where random numbers are encrypted and verified using a shared key in steps S1510 through S1555, this is not restrictive, and an authentication format described in RFC 6347 may be used to perform authentication. RFC 6347 is described in IETF: RFC 6347: Datagram Transport Layer Security Version 1.2, Internet Engineering Task Force (IETF), January 2008, and accordingly will not be described here.

Seventh Modification

Although an arrangement is described in the embodiment above where, when a controller newly joins a group, the newly-joining controller and controllers already existing within the group activate their registration modes and perform device registration processing, the present disclosure is not restricted to this. For example, the following may be performed. When a controller newly joins, the controller newly joining and a device within the group activate their registration modes. At this time, the device references the connected controller management table and transmits information of the controller set as the SC of the device, to the newly-joining controller. The controller newly joining receives the information of the SC, and can join by authentication thereof as the SC. Thus, even if the group SC is at a remote location away from home, authentication between the SC and the newly-joining controller can be performed by an affiliated device under the SC activating the registration mode.

Eighth Modification

The controller may display electric power consumption of connected devices, electric power of a battery, amount of power generated by a solar power generator, and so forth.

Ninth Modification

The controller may be a distribution board installed in the home.

Tenth Modification

Description has been made in the first embodiment that the controller which has become the SC manages the group key valid time and transmits a group key updating notification to the devices in the group key updating processing. However, an arrangement may be made where the group key valid time is notified from the controller which has become the SC to the devices, the devices manage the group key valid time, and the devices transmit group key updating notifications to the controller which has become the SC.

Eleventh Modification

Although the first embodiment manages the group key valid time as remaining time, this is not restrictive, and may be managed as the time when the group key was generated or the end time of the valid period of the group key. In a case of managing as the time when the group key was generated, the length of the valid period of the group key is separately stored, the current time is compared with a time obtained by adding the valid period of the group key to the time when the group key was generated, and whether or not to update the group key is determined. In a case of managing as the end time of the valid period of the group key, the current time is compared with end time of the valid period of the group key, and whether or not to update the group key is determined.

Twelfth Modification

Although in a case where a device that has not updated the group key exists in the group key updating processing, a group key updating notification is transmitted to update the group key in the first embodiment, in a case where the power of this device is not on, the group key updating notification may be periodically transmitted.

Thirteenth Modification

Although in a case where a device that has not updated the group key exists in the group key updating processing, a group key updating notification is transmitted to update the group key in the first embodiment, in a case where this device is being controlled by a controller with which it is paired, this device may notify of group key extension time, with group key updating processing being performed after the extension time elapses.

Fourteenth Modification

Although description is made in the first embodiment that in the SC handover processing, the shared key is calculated (S1330) between the new SC and affiliated devices under the old SC after the SC change notification, this may be performed at any timing as long as before the group key valid time runs out and group key updating processing is performed. For example, this may be performed when a device is not being operated, or may be immediately before the group key updating processing. Accordingly, the shared key can be calculated between the controller and devices without placing a burden on operations of the device.

Fifteenth Modification

Although the controller A determines the SC (steps 31210 through S1240) during negotiation processing in the first embodiment, this is not restrictive, and each of the controller A and controller B may determine the SC.

Sixteenth Modification

The above-described devices specifically are computer systems configured including a microprocessor, read-only memory (ROM), random access memory (RAM), hard disk unit, display unit, keyboard, mouse, or the like. Computer programs are recorded in the RAM or hard disk unit. The devices achieve their functions by the microprocessor operating according to the computer programs. A computer program is configured by combining multiple command codes indicating commands to a computer.

Seventeenth Modification

Part or all of the components of which the devices described in the above embodiments are configured may be configured as one system LSI A system LSI is a super-multifunctional LSI fabricated with multiple components integrated on a single chip, and specifically is a computer system configured including a microprocessor, ROM, RAM, and so forth. The RAM stores computer programs. The system LSI achieves its functions by the microprocessor operating according to the computer programs. The components of which the above-described devices are configured may each be independently formed as a single chip, or part or all may be included in a single chip.

While a system LSI has been described, there are different names according to the degree of integration, such as IC, LSI, super LSI, and ultra LSI. The way in which the integrated circuit is formed is not restricted to LSIs, and may be realized by dedicated circuits or general-purpose processors. A Field Programmable Gate Array (FPGA) capable of being programmed after manufacturing the LSI, or a reconfigurable processor of which the connections and settings of circuit cells within the LSI can be reconfigured, may be used.

Moreover, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

Eighteenth Modification

Part or all of the components of which the above-described devices are configured may be configured as an IC card detachably mountable to each device, or a standalone module. The IC card or the module is a computer system configured including a microprocessor, ROM, RAM, and so forth. The IC card or the module may include the above-described super-multifunctional LSI. The IC card or the module achieves its functions by the microprocessor operating according to the computer program. The IC card or the module may be tamper-resistant.

Nineteenth Modification

The present invention may be the method described above, may be a computer program which realizes these methods by a computer, or may be digital signals made up of the computer program. The present invention may be the computer program or the digital signals recorded in a computer-readable recording medium, such as for example, a flexible disk, hard disk, CD-ROM, MO, DVD, DVD-ROM, DVD-RAM, BD (Blu-ray (a registered trademark) Disc), semiconductor memory, or the like. The present disclosure may also be the digital signals recorded in these recording mediums.

The present disclosure may be an arrangement where the computer program or the digital signals are transmitted over an electric communication line, wireless or cable communication line, a network of which the Internet is representative, data broadcasting, or the like.

The present disclosure may be a computer system having a microprocessor and memory, where the memory stores the computer program, and the microprocessor operates according to the computer program. This may also be carried out by another independent computer system, by the program or digital signals being recorded in the recording medium and being transported, or by the program or digital signals being transferred over the network or the like.

Twentieth Modification

Forms realized by optionally combining the above-described embodiment and the above-described modifications are also included in the scope of the present disclosure.

Supplement

The following supplemental description of the configuration and advantages of the present disclosure will further be given.

A. An authentication method according to one form of the present disclosure is an authentication method for a group to which one or more devices and two or more controllers on a network belong, wherein at least one controller within the group decides a coordinator that manages a group key used in common in the group, from the controllers in the group, in accordance with attributes of the controllers, and wherein the coordinator generates a group key, executes mutual authentication with devices and controllers within the group, and shares the generated group key with devices and controllers that have succeeded in authentication.

According to this configuration, in a case where multiple controllers exist in a group on a network, a suitable controller can be selected as the SC that manages a group key used in common within the group.

B. An authentication method according to one form of the present disclosure is an authentication method for a group to which one or more devices and a first controller on a network belong, wherein the first controller generates a first group key, executes first mutual authentication with devices within the group, and shares the first group key with devices that have succeeded in authentication, wherein, in a case where a second controller newly joins the group, at least one controller within the group decides a coordinator that manages a group key used in common in the group, from the controllers in the group, in accordance with attributes of the controllers, wherein the first controller executes second mutual authentication with the coordinator, and shares the first group key in a case where the authentication is successful, wherein the coordinator performs encrypted communication within the group using the first group key, and wherein the coordinator generates a second group key, executes third mutual authentication with the devices and controllers within the group, and updates the group key of the devices and controllers that have succeeded in authentication to the second group key.

According to this configuration, in a case where multiple controllers exist in a group on a network, a suitable controller can be selected as the SC that manages a group key used in common within the group. Further, in a case where the SC has been changed, the controller that has newly become the SC can perform encrypted broadcast communication to multiple devices in the group, using the group key received from the controller that was the old SC.

C. In an authentication method according to one form of the present disclosure, in the authentication method according to the form B, the first controller transmits authentication information of devices within the network to the coordinator, wherein the coordinator executes the third mutual authentication using authentication information received from the first controller.

According to this configuration, authentication between the new SC and affiliated devices under the old SC can be simplified. As a result, the processing load on devices and controllers can be reduced.

D. In an authentication method according to one form of the present disclosure, in the authentication method according to the form B, the devices and controllers within the group have a registration mode for executing mutual authentication and registering another party with which the authentication has been successful, wherein, in a case where the second mutual authentication has been successful, the first controller transmits an activation instruction for the registration mode to the coordinator and the devices within the group, wherein the devices within the group receive the activation instruction for the registration mode from the first controller and activate the registration mode, and wherein the coordinator receives the activation instruction for the registration mode from the first controller and activates the registration mode, and executes the third mutual authentication with the devices that have activate the registration mode.

According to this configuration, affiliated devices under the old SC and the new SC can be paired without the user manually activating the registration mode, so ease of use for the user improves.

E. In an authentication method according to one form of the present disclosure, in the authentication method according to the forms A or B, the controllers within the group each store a public key certificate in which is described one or more attributes of itself, wherein the controllers within the group perform the decision using the attributes described in the public key certificates stored in each.

According to this configuration, a suitable controller can be selected as the SC by referencing controller attributes described in public key certificates.

F. In an authentication method according to one form of the present disclosure, in the authentication method according to the form E, the attributes described in the public key certificate are one of dedicated, general-purpose, and application, wherein the attributes of dedicated indicate that the controller only provides dedicated functions for a particular object, wherein the attributes of general-purpose indicate that the controller provides functions for each a plurality of objects, wherein the attributes of application indicate that the controller is software that runs on a device providing functions for each a plurality of objects, wherein a controller of which the attributes are dedicated becomes a coordinator with priority over controllers of which the attributes are general-purpose and application, and wherein a controller of which the attributes are general-purpose becomes a coordinator with priority over controllers of which the attributes are application.

According to this configuration, a controller with fewer power off and network disconnected states (controller with attributes "dedicated device" described in public key certificate) is selected as the SC more readily. Also, a controller with more power off and network disconnected states (controller with attributes "application" described in public key certificate) is selected as the SC less readily.

G. In an authentication method according to one form of the present disclosure, in the authentication method according to the form E, the attributes described in the public key certificate are version information, wherein controllers within the group perform the decision in accordance with the newness of a version No. indicated by version information described in the public key certificate stored in each.

According to this configuration, a controller having the newest functions can be selected as the SC.

H. In an authentication method according to one form of the present disclosure, in the authentication method according to the form E, the attributes described in the public key certificate are version information, wherein controllers within the group perform the decision in accordance with a corresponding device count indicated by version information described in the public key certificate stored in each.

According to this configuration, a controller having the most corresponding devices can be selected as the SC.

I. In an authentication method according to one form of the present disclosure, in the authentication method according to the forms A or B, the attributes of the controller are accumulated running time of the controller.

According to this configuration, the probability that authentication processing cannot be performed due to malfunction of the SC can be reduced.

J. In an authentication method according to one form of the present disclosure, in the authentication method according to the forms A or B, the attributes of the controller are elapsed time from time of manufacturing of the controller.

According to this configuration, the probability that authentication processing cannot be performed due to malfunction of the SC can be reduced.

K. In an authentication method according to one form of the present disclosure, in the authentication method according to the forms A or B, the attributes of the controller are the number of devices paired with the controller.

According to this configuration, the number of devices where re-authentication becomes necessary due to the SC changing can be reduced.

L. In an authentication method according to one form of the present disclosure, in the authentication method according to the forms A or B, the controllers within the group have a display and operating unit, wherein the deciding is processing where the controllers in the group display information indicating attributes of the controllers on the display, accept user input selecting one controller from the controllers in the group with regard to the display from the operating unit, and making the selected controller to be the coordinator.

According to this configuration, in a case where multiple controllers exist in a group on a network, a suitable controller can be selected as the SC.

M. An authentication method according to one form of the present disclosure is an authentication method for a group to which one or more devices and one or more controllers including a first controller on a network belong, wherein the first controller generates a first group key, executes first mutual authentication with devices within the group, and shares the first group key with devices that have succeeded in authentication, wherein, in a case where a second controller newly joins the group, at least one controller within the group decides a coordinator that manages a group key used in common in the group, from controllers including the one or more controllers and the second controller newly joined in the group, in accordance with attributes of the controllers, wherein the first controller executes second mutual authentication with the coordinator, and shares the first group key with the coordinator in a case where the authentication is successful, wherein the coordinator performs encrypted communication within the group using the first group key, and wherein the coordinator generates a second group key when valid time of the first group key is equal to or smaller than a predetermined value, executes third mutual authentication with the devices and controllers within the group, and updates the group key of the devices and controllers that have succeeded in authentication to the second group key.

N. A controller according to one form of the present disclosure is a controller comprising: a connecting unit; a negotiator; and an authentication processing unit, wherein the connecting unit connects to a group to which one or more devices and one or more other controllers on a network belong, where one controller of the other controllers generates a first group key, executes first mutual authentication with devices within the group, and shares the first group key with devices that have succeeded in authentication, wherein the negotiator decides a coordinator that manages the group key used in common in the group, from the controllers in the group, in accordance with attributes of the controllers, and wherein the authentication processing unit executes second mutual authentication with the one controller, receives the first group key in a case where the authentication is successful, and performs encrypted communication within the group using the first group key, and further, in a case where the authentication unit itself is decided to be the coordinator, generates a second group key when valid time of the first group key is equal to or smaller than a predetermined value, receives authentication information of devices within the group from the one controller, executes third mutual authentication with devices and controllers within the group using the received authentication information, and updates the group key of the devices and controllers that have succeeded in authentication to the second group key.

O. A controller according to one form of the present disclosure is a controller comprising: an authentication unit; and a negotiator, and is a controller within a group to which one or more devices and one or more controllers on a network belong, wherein the authentication processing unit generates a first group key, executes first mutual authentication with devices within the group, and shares the first group key with devices that have succeeded in authentication, wherein, in a case where another controller newly joins the group, the negotiator decides a coordinator that manages a group key used in common in the group, from controllers including the one or more controllers and the other controller newly joined in the group, in accordance with attributes of the controllers, wherein the authentication processing unit executes second mutual authentication with the coordinator, and shares the first group key with the coordinator in a case where the authentication is successful, transmits authentication information of devices in the group to the coordinator, performs third mutual authentication with the coordinator, and in a case where authentication is successful, receives a second group key generated by the coordinator when valid time of the first group key is equal to or smaller than a predetermined value, and updates the group key that is stored to the second group key.

According to the present disclosure, in a system where multiple controllers exist within a group configured within a network such as a HAN or the like, a controller that performs group key distribution and updating can be suitably decided. The present disclosure thus is useful as an authentication system or the like in a system to which various devices and multiple controllers connect and operate while communicating with each other.

What is claimed is:

1. An authentication method for a group to which one or more devices and one or more controllers belong, the authentication method comprising:
   a first controller on a network generating a first group key, executing first mutual authentication with the one or more devices within the group, and sharing the first group key with the one or more devices that have succeeded in the first mutual authentication, wherein the first controller is included in the one or more controllers that belongs to the group;
   in a case where a second controller newly joins the group, at least one controller deciding a coordinator that manages a group key used in common in the group, from two or more controllers, including the one or more controllers and the second controller newly joined in the group, wherein the at least one controller is included in the two or more controllers;

the first controller executing second mutual authentication with the coordinator, and sharing the first group key with the coordinator in a case where the second mutual authentication is successful;

the coordinator performing encrypted communication within the group using the first group key; and the coordinator generating a second group key when the first group key valid time runs out and before updating the first group key, executing third mutual authentication with the one or more devices and a third controller, which is one or more controllers included in the two or more controllers and which is different from the coordinator, within the group, and updating the first group key of the one or more devices and the third controller that have succeeded in the third authentication to the second group key.

2. The authentication method according to claim 1, further comprising:

the first controller transmitting authentication information of the one or more devices within the network to the coordinator, wherein the coordinator executes the third mutual authentication using authentication information received from the first controller.

3. The authentication method according to claim 1, wherein the one or more devices within the group have a registration mode for executing the third mutual authentication and registering another party with which the third authentication has been successful, wherein the two or more controllers within the group have a registration mode for executing the second mutual authentication or the third mutual authentication and registering another party with which the second authentication or the third mutual authentication has been successful, wherein in a case where the second mutual authentication has been successful, the first controller further transmits an activation instruction for the registration mode to the coordinator and the one or more devices within the group, wherein the one or more devices within the group receive the activation instruction for the registration mode from the first controller and activate the registration mode, and wherein the coordinator receives the activation instruction for the registration mode from the first controller and activates the registration mode, and executes the third mutual authentication with the one or more devices that have activated the registration mode.

4. The authentication method according to claim 1, wherein the at least one controller within the group has a display and operator, and wherein the deciding by the at least one controller further includes displaying, using the display, information of the two or more controllers, and accepting, from the operator, user input selecting, as the coordinator, one controller from the two or more controllers in the group with regard to the display, and wherein the selected one controller is decided as the coordinator.

5. A first controller, comprising:

a processor; and a memory that stores a program that, when executed by the processor, causes the processor to function as a connector that connects to a group to which one or more devices and one or more controllers on a network belong, where the first controller of the one or more controllers generates a first group key, executes first mutual authentication with the one or more devices within the group, and shares the first group key with the one or more devices that have succeeded in the first mutual authentication;

a negotiator that decides a coordinator that manages a group key used in common in the group, from two or more controllers, including the one or more controllers and the first controller; and an authentication processor that executes second mutual authentication with the one of the one or more controllers that receives the first group key from the one of the one or more controllers that in a case where the second mutual authentication is successful, and performs encrypted communication within the group using the first group key, wherein, in a case where the first controller itself is decided to be the coordinator, the authentication processor further generates a second group key when the first group key valid time runs out and before updating the first group key, receives authentication information of the one or more devices within the group from the one of the one or more controllers, executes third mutual authentication with the one or more devices and the one or more controllers within the group using the received authentication information, and updates the first group key of the one or more devices and the one or more controllers that have succeeded in the third authentication to the second group key.

6. A first controller, in one or more controllers on a network that belong to a group to which one or more devices further belong, the first controller comprising:

a processor; and a memory that stores a program that, when executed by the processor, causes the processor to function as an authentication processor that generates a first group key, that executes first mutual authentication with the one or more devices within the group, and that shares the first group key with the one or more devices that have succeeded in the first mutual authentication; and a negotiator that, in a case where a second controller newly joins the group, decides a coordinator that manages a group key used in common in the group, from two or more controllers including the one or more controllers and the second controller newly joined in the group, wherein the authentication processor further executes second mutual authentication with the coordinator, and shares the first group key with the coordinator in a case where the second mutual authentication is successful;

transmits authentication information of the one or more devices in the group to the coordinator; and performs third mutual authentication with the coordinator, and in a case where the third authentication is successful, receives a second group key generated by the coordinator when the first group key valid time runs out and before updating the first group key, and updates the first group key of the first controller to the second group key.

* * * * *